US007234018B1

(12) United States Patent
Purcell et al.

(10) Patent No.: US 7,234,018 B1
(45) Date of Patent: Jun. 19, 2007

(54) LAYERED CROSSBAR FOR INTERCONNECTION OF MULTIPLE PROCESSORS AND SHARED MEMORIES

(75) Inventors: Stephen Clark Purcell, Mountain View, CA (US); Christopher Thomas Cheng, Santa Clara, CA (US)

(73) Assignee: Pasternak Solutions LLC, Los Altos, CA (US)

( * ) Notice: Subject to any disclaimer, the term of this patent is extended or adjusted under 35 U.S.C. 154(b) by 212 days.

(21) Appl. No.: 11/023,969

(22) Filed: Dec. 27, 2004

Related U.S. Application Data

(63) Continuation of application No. 09/925,137, filed on Aug. 8, 2001, now Pat. No. 6,836,815.

(60) Provisional application No. 60/304,933, filed on Jul. 11, 2001.

(51) Int. Cl.
    *G06F 13/00*    (2006.01)
    *G06F 12/00*    (2006.01)
    *G06T 1/00*     (2006.01)
    *G06T 1/60*     (2006.01)

(52) U.S. Cl. .................... 710/317; 711/105; 711/148

(58) Field of Classification Search ............ 710/317, 710/100, 316; 703/1; 716/1; 370/381, 351, 370/362; 709/213, 249; 712/11, 20, 35; 340/2.28; 382/276; 358/444, 462; 711/148, 711/105
See application file for complete search history.

(56) References Cited

U.S. PATENT DOCUMENTS

| 4,852,083 | A | * | 7/1989 | Niehaus et al. ............. 370/381 |
| 5,055,997 | A | * | 10/1991 | Sluijter et al. ............. 710/317 |
| 5,113,390 | A | * | 5/1992 | Hayashi et al. ............. 370/352 |
| 5,613,146 | A | * | 3/1997 | Gove et al. .................... 712/20 |
| 5,701,507 | A | * | 12/1997 | Bonneau et al. ................ 716/8 |
| 5,878,241 | A | * | 3/1999 | Wilkinson et al. .......... 712/203 |
| 6,070,003 | A | * | 5/2000 | Gove et al. .................. 710/317 |
| 6,219,627 | B1 | * | 4/2001 | Bonneau et al. ................ 703/1 |
| 6,836,815 | B1 | * | 12/2004 | Purcell et al. .............. 710/317 |
| 6,961,803 | B1 | * | 11/2005 | Purcell et al. .............. 710/317 |
| 6,970,454 | B1 | * | 11/2005 | Purcell et al. .............. 370/355 |
| 7,107,386 | B1 | * | 9/2006 | Purcell et al. .................. 711/5 |
| 2005/0080978 | A1 | * | 4/2005 | Kelley et al. ................ 710/317 |

OTHER PUBLICATIONS

"Design of a 64-processor by 128-memory crossbar switching network" by Miracky et al. (abstract only) Publication Date: Oct. 3-5, 1988.*

* cited by examiner

*Primary Examiner*—Gopal C. Ray
(74) *Attorney, Agent, or Firm*—Townsend and Townsend and Crew, LLP

(57) ABSTRACT

A method and apparatus includes a plurality of processor groups each having a plurality of processor switch chips each having a plurality of processors and a processor crossbar, each processor connected to the processor crossbar; a plurality of switch groups each having a plurality of switch crossbar chips each having a plurality of switch groups each having a plurality of switch crossbar chips each having a plurality of switch crossbars each connected to a processor crossbar in each processor group, wherein no two switch crossbars in a switch group are connected to the same processor crossbar; a plurality of memory groups having a plurality of memory switch chips each having a plurality of memory controllers and a memory crossbar, each memory controller connected to the memory crossbar, each memory crossbar in each memory group connected to all of the switch crossbar in a corresponding one of the switch groups, wherein no two memory groups are connected to the same switch group.

18 Claims, 22 Drawing Sheets

LAYERED CROSSBAR FOR INTERCONNECTION OF MULTIPLE PROCESSORS AND SHARED MEMORIES

CROSS-REFERENCE TO RELATED APPLICATIONS

This application is a continuation of U.S. patent application Ser. No. 09/925,137, filed Aug. 8, 2001 now U.S. Pat. No. 6,836,815, which claims the benefit under 35 U.S.C. § 119(e) of U.S. patent application No. 60/304,933, filed Jul. 11, 2001.

BACKGROUND

The present invention relates generally to interconnection architecture, and particularly to interconnecting multiple processors with multiple shared memories.

Advances in the area of computer graphics algorithms have led to the ability to create realistic and complex images, scenes and films using sophisticated techniques such as ray tracing and rendering. However, many complex calculations must be executed when creating realistic or complex images. Some images may take days to compute even when using a computer with a fast processor and large memory banks. Multiple processor systems have been developed in an effort to speed up the generation of complex and realistic images. Because graphics calculations tend to be memory intensive applications, some multiple processor graphics systems are outfitted with multiple, shared memory banks. Ideally, a multiple processor, multiple memory bank system would have full, fast interconnection between the memory banks and processors. For systems with a limited number of processors and memory banks, a crossbar switch is an excellent choice for providing fast, full interconnection without introducing bottlenecks.

However, conventional crossbar-based architectures do not scale well for a graphics system with a large number of processors. Typically, the size of a crossbar switch is limited by processing and/or packaging technology constraints such as the maximum number of pins per chip.

SUMMARY

In general, in one aspect, the invention features a method and apparatus. It includes a plurality of processor groups each having a plurality of processor switch chips each having a plurality of processors and a processor crossbar, each processor connected to the processor having a plurality of switch crossbars each connected to a processor crossbar in each processor group, wherein no two switch crossbars in a switch group are connected to the same processor crossbar; a plurality of memory groups each having a plurality of memory switch chips each having a plurality of memory controllers and a memory crossbar, each memory controller connected to the memory crossbar, each memory crossbar in each memory group connected to all of the switch crossbars in a corresponding one of the switch groups, wherein no two memory groups are connected to the same switch group; and a plurality of memory chips each having a plurality of memory tracks each having a plurality of shared memory banks, each memory track connected to a different one of the memory controllers.

In general, in one aspect, the invention features a method and apparatus for use in a scalable graphics system. It includes a processor switch chip having a plurality of processors each connected to a processor crossbar; and a memory switch chip having a plurality of memory controllers each connected to a memory crossbar and controlling a shared memory bank; and wherein the memory crossbar is connected to the processor crossbar.

Particular implementations can include one or more of the following features. Implementations include an intermediate switch chip having a switch crossbar, the switch crossbar connected between the processor crossbar and the memory crossbar. Each memory controller is connected to a memory chip having a shared memory bank. The memory switch chip includes a memory bank connected to the memory controller. The apparatus is used for the purposes of ray-tracing.

Advantages that can be seen in implementations of the invention include one or more of the following. Implementations enable low latency memory and processor scalability in graphics systems such as ray-tracing or rendering farms with currently available packaging and interconnect technology.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
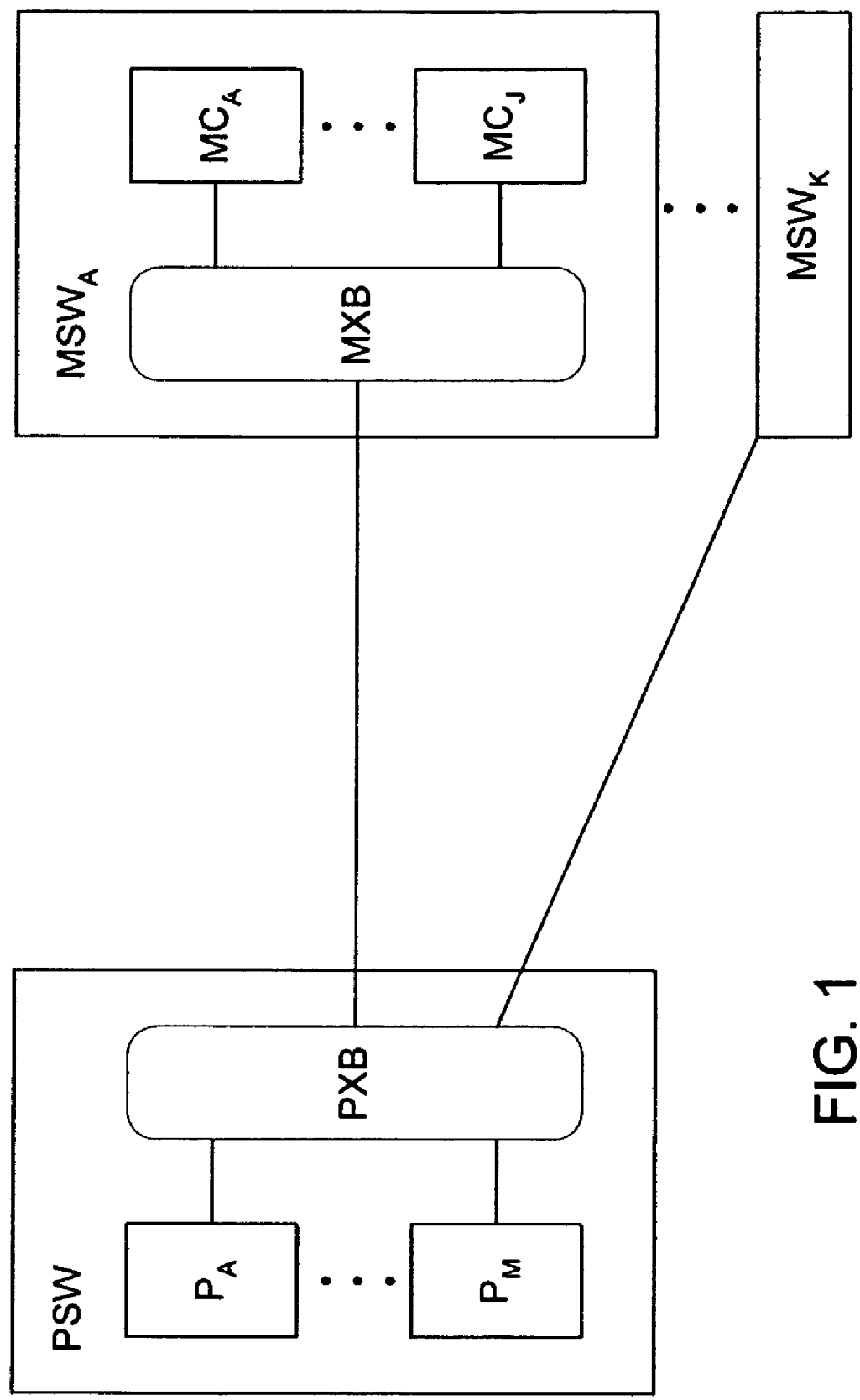
FIG. 1 illustrates an implementation with multiple memory switches.

FIG. 1 illustrates an implementation with multiple memory switches. As shown in FIG. 1, a processor switch PSW is connected to a plurality of memory switches $MSW_A$ through $MSW_K$ by a plurality of external busses. Processor switch PSW includes a plurality of processors $P_A$ through $P_M$. Each processor P is connected to a processor crossbar PXB by an internal bus.

Each memory switch MSW includes a plurality of memory controllers $MC_A$ through $MC_J$. Each memory controller MC is connected to a memory crossbar MXB by an internal bus. Each processor crossbar PXB is connected to a plurality of memory crossbars MXB.

Processor crossbar PXB provides full crossbar interconnection between processors P and memory crossbars MXB. Memory crossbars MXB provide full crossbar interconnection between memory controllers MC and processor crossbar PXB.

In one implementation, each of processor switch PSW and memory switches MSW is fabricated as a separate semiconductor chip. One advantage of this implementation is that the number of off-chip interconnects is minimized. Off-chip interconnects are generally much slower and narrower than on-chip interconnects.

Figure 2:
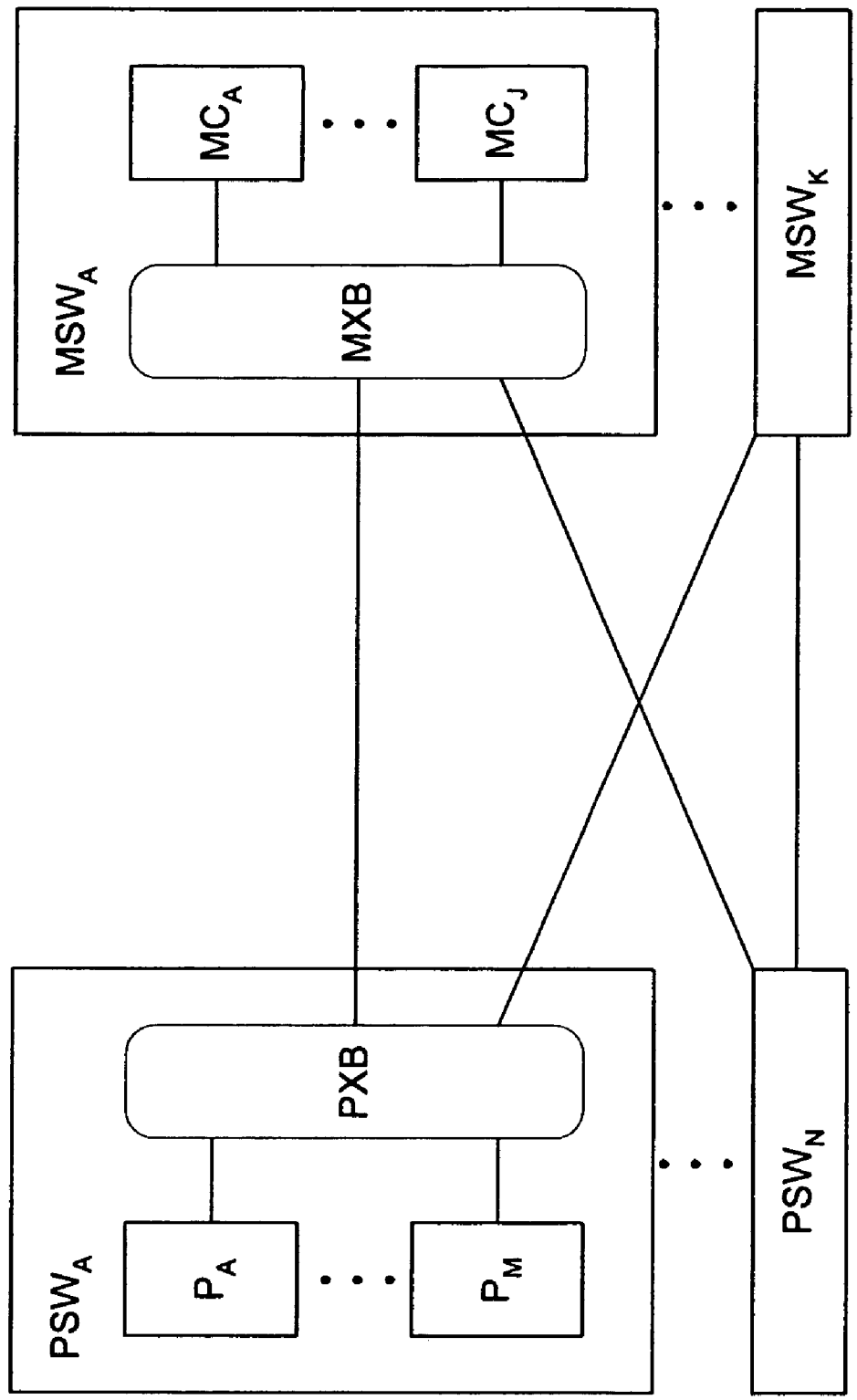
FIG. 2 illustrates an implementation with multiple processor switches and multiple memory switches.

FIG. 2 illustrates an implementation with multiple processor switches and multiple memory switches. As shown in FIG. 2, a plurality of processor switches $PSW_A$ through $PSW_N$ is connected to a plurality of memory switches $MSW_A$ through $MSW_K$ by a plurality of external busses. Each processor switch PSW includes a plurality of processors $P_A$ through $P_M$. Each processor P is connected to a processor crossbar PXB by an internal bus.

Each memory switch MSW includes a plurality of memory controllers $MC_A$ through $MC_J$. Each memory controller MC is connected to a memory crossbar MXB by an internal bus. Each processor crossbar PXB is connected to a plurality of memory crossbars MXB.

Processor crossbar PXB provides full crossbar interconnection between processors P and memory crossbars MXB. Memory crossbars MXB provide full crossbar interconnection between memory controllers MC and processor crossbars PXB.

In one implementation, each of processor switches PSW and memory switches MSW is fabricated as a separate semiconductor chip. One advantage of this implementation is that the number of off-chip interconnects is minimized.

Figure 3:
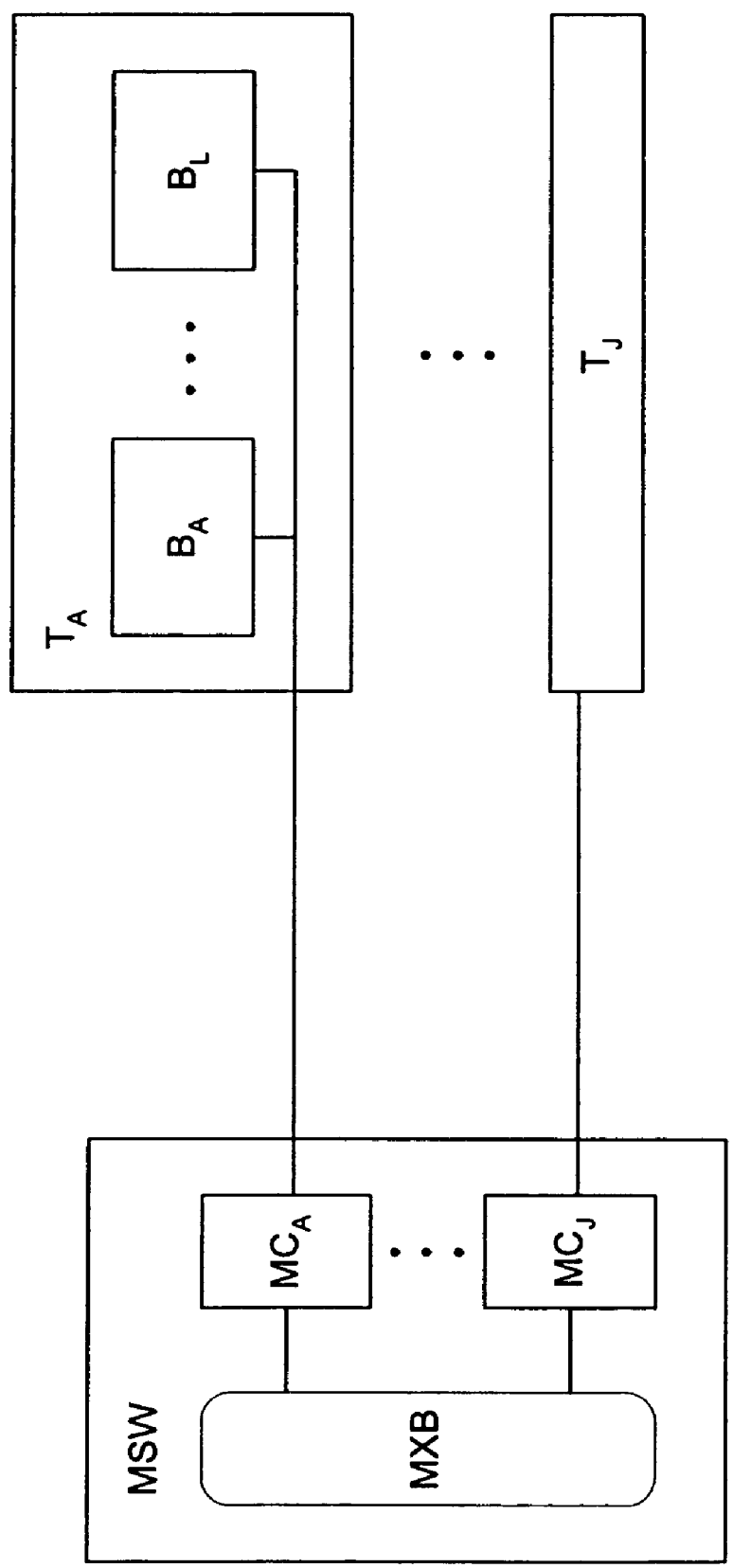
FIG. 3 illustrates an implementation with multiple memory tracks.

FIG. 3 illustrates an implementation with multiple memory tracks. As shown in FIG. 3, a memory switch MSW includes a plurality of memory controllers $MC_A$ through $MC_J$. Each memory controller MC is connected to one of a plurality of memory tracks $T_A$ through $T_J$ by a memory bus. Each memory track T includes a plurality of shared memory banks $B_A$ through $B_L$. Each memory track T can be implemented as a conventional memory device such as a synchronous dynamic random-access memory (SDRAM).

In one implementation, memory switch MSW and memory tracks T are fabricated as separate semiconductor chips. In another implementation, memory switch MSW and memory tracks T are fabricated together as a single semiconductor chip.

Figure 4:
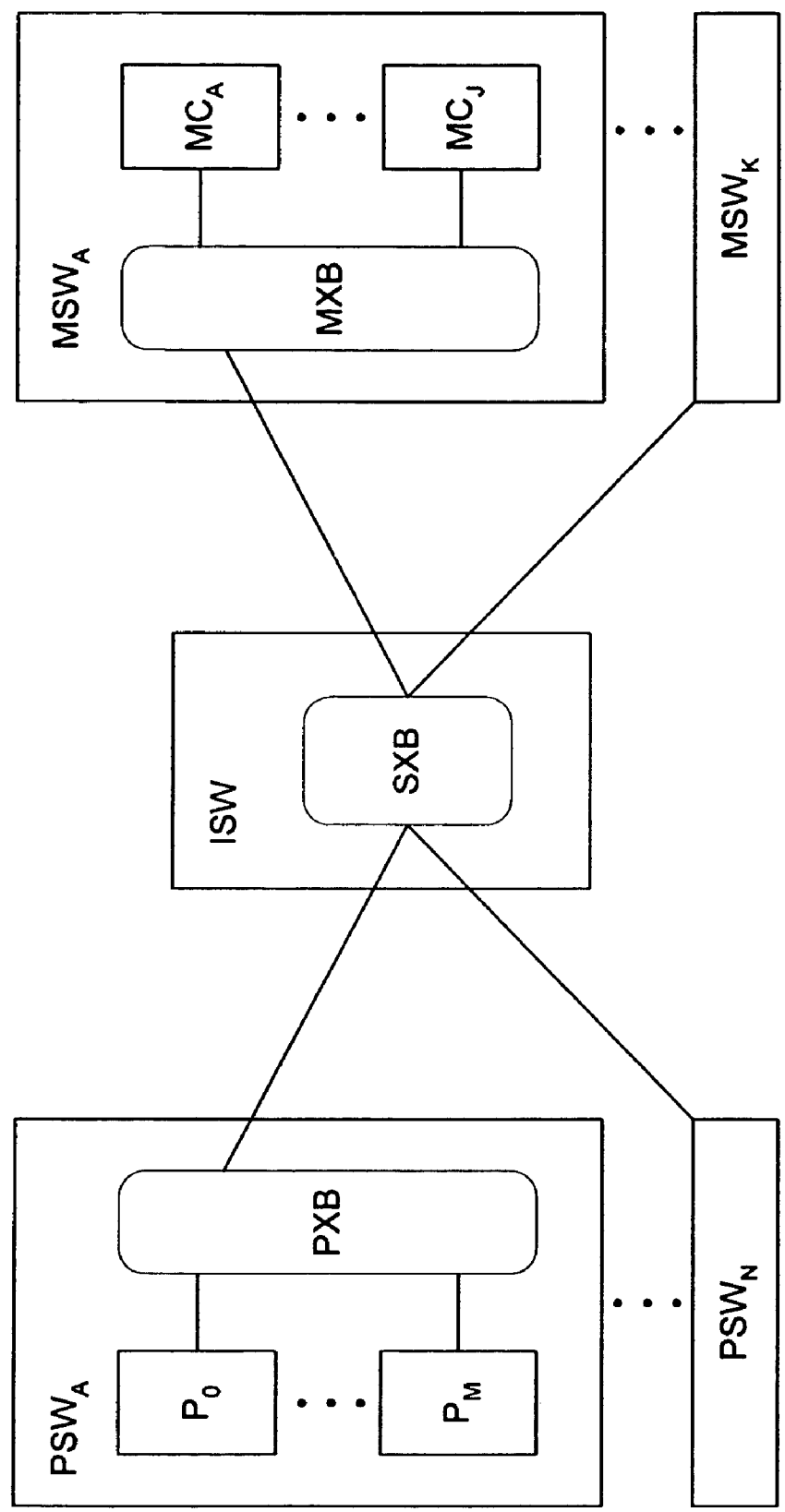
FIG. 4 illustrates an implementation with an intermediate switch.

FIG. 4 illustrates an implementation with an intermediate switch. As shown in FIG. 4, a plurality of processor switches $PSW_A$ through $PSW_N$ is connected to a plurality of memory switches $MSW_A$ through $MSW_K$ by a plurality of external busses and an intermediate switch ISW. Each processor switch PSW includes a plurality of processors $P_A$ through $P_M$. Each processor P is connected to a processor crossbar PXB by an internal bus.

Each memory switch MSW includes a plurality of memory controllers $MC_A$ through $MC_J$. Each memory controller MC is connected to a memory crossbar MXB by an internal bus.

Intermediate switch ISW includes a switch crossbar SXB. Each processor crossbar PXB is connected to switch crossbar SXB. Each memory crossbar MXB is connected to switch crossbar SXB.

Processor crossbars PXB provides full crossbar interconnection between processors P and switch crossbar SXB. Memory crossbars MXB provide full crossbar interconnection between memory controllers MC and switch crossbar SXB. Switch crossbar SXB provides full crossbar interconnection between processor crossbar PXB and memory crossbar MXB.

In one implementation, each of processor switches PSW, memory switches MSW and intermediate switch ISW is fabricated as a separate semiconductor chip. One advantage of this implementation is that the number of off-chip interconnects is minimized.

Figure 5:
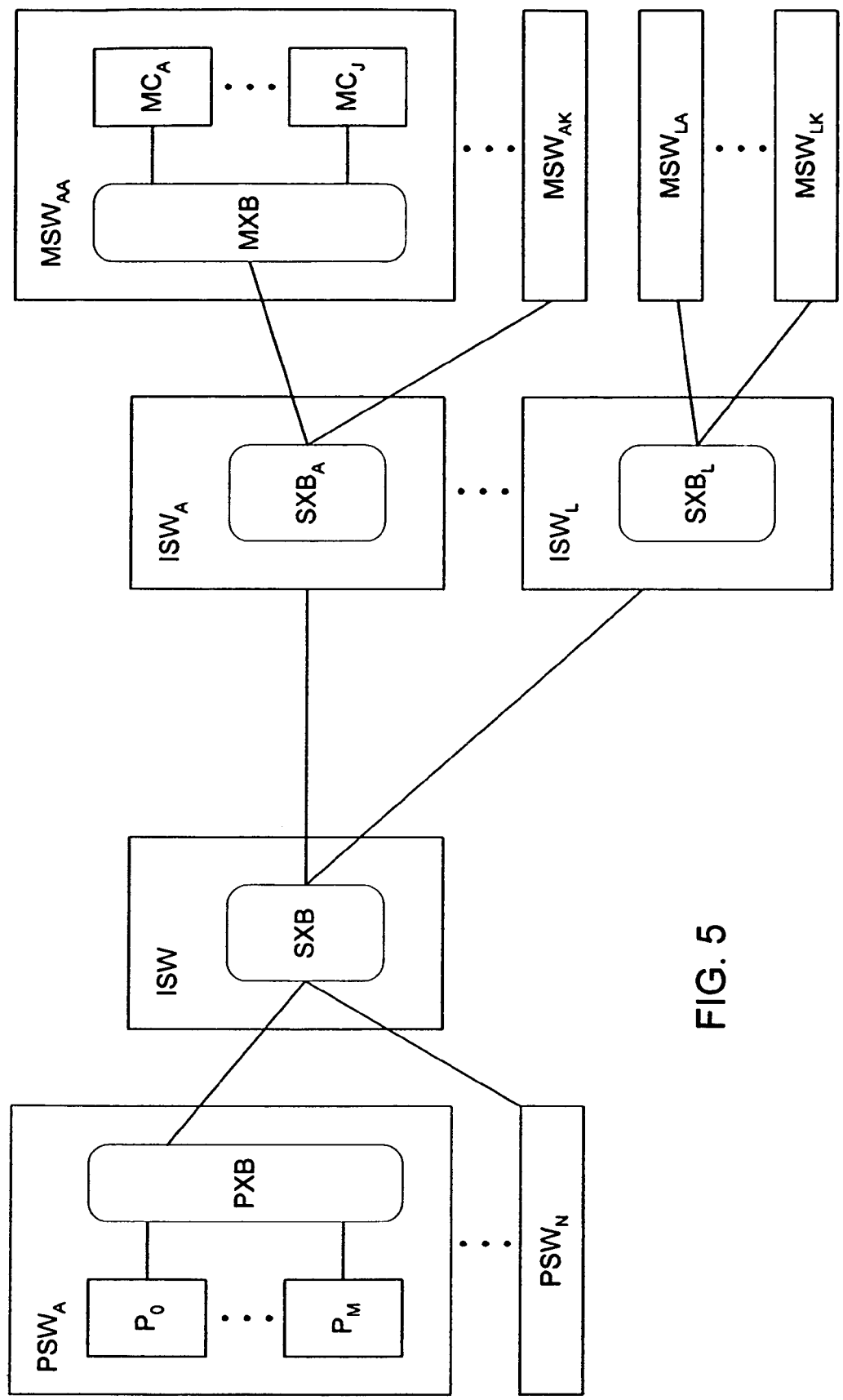
FIG. 5 illustrates an implementation with multiple levels of intermediate switches.

FIG. 5 illustrates an implementation with multiple levels of intermediate switches. As shown in FIG. 5, a plurality of processor switches $PSW_A$ through $PSW_N$ is connected to a plurality of memory switches $MSW_A$ through $MSW_K$ by a plurality of external busses and intermediate switches ISW. Each processor switch PSW includes a plurality of processors $P_A$ through $P_M$. Each processor P is connected to a processor crossbar PXB by an internal bus.

Intermediate switch ISW includes a switch crossbar SXB. Each processor crossbar PXB is connected to switch crossbar SXB. Intermediate switch ISW is connected to a plurality of intermediate switches $ISW_A$ through $ISW_L$. Each of intermediate switches $ISW_A$ through $ISW_L$ includes a switch crossbar SXB that is connected to a plurality of memory switches MSW. For example, intermediate switch $ISW_A$ includes a switch crossbar $SXB_A$ that is connected to memory switches $MSW_{AA}$ through $MSW_{AK}$. As a further example, intermediate switch $ISW_L$ includes a switch crossbar $SXB_L$ that is connected to memory switches $MSW_{LA}$ through $MSW_{LK}$.

Each memory switch MSW includes a plurality of memory controllers $MC_A$ through $MC_J$. Each memory controller MC is connected to a memory crossbar MXB by an internal bus.

Processor crossbars PXB provide full crossbar interconnection between processors P and switch crossbar SXB. Switch crossbar SXB provides full crossbar interconnection between processor crossbars PXB and switch crossbars $SXB_A$ through $SXB_L$. Switch crossbars $SXB_A$ through $SXB_L$ provide full crossbar interconnection between switch crossbar SXB and memory crossbars MXB. Memory crossbars MXB provide full crossbar interconnection between memory controllers MC and switch crossbars $SXB_A$ through $SXB_L$.

In one implementation, each of processor switches PSW, memory switches MSW and intermediate switches ISW is fabricated as a separate semiconductor chip. One advantage of this implementation is that the number of off-chip interconnects is minimized. Other implementations provide further layers of intermediate switches ISW. Advantages of these other implementations includes scalability.

Figure 6:
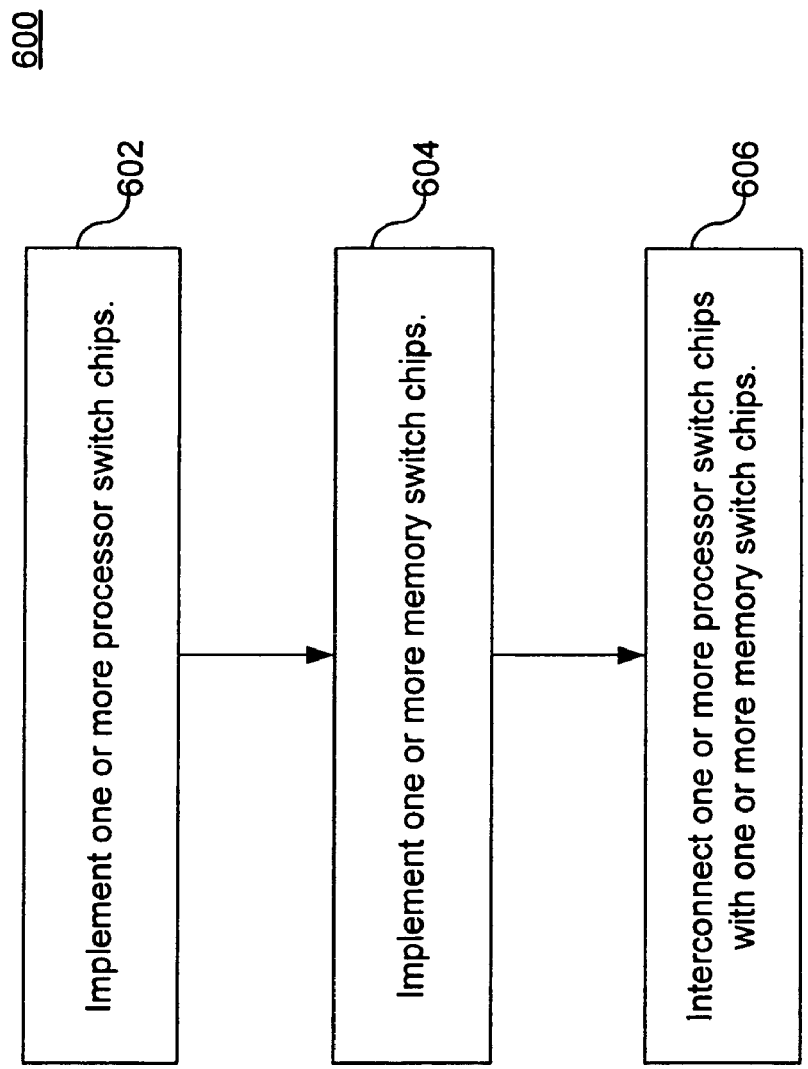
FIG. 6 illustrates a process according to one implementation.

FIG. 6 illustrates a process 600 according to one implementation. The process begins by implementing one or more processor switch chips (step 602). According to one implementation, a processor switch chip includes one or more processors and a processor crossbar switch. The process continues by implementing one or more memory switch chips (step 604). According to one implementation, a memory switch chip includes one or more memory controllers and a memory crossbar switch. In some cases, one or more memory banks may be implemented on the memory switch chip. The process continues by interconnecting one or more of the processor switch chips with one or more of the memory switch chips (step 606).

In one implementation of process 600, the processor switch chips and memory switch chips are connected by connecting the processor crossbars to the memory crossbars, according to the current invention. However, for additional scalability, one or more intermediate crossbars may be implemented. In this case, the processor crossbar switches may be connected to the intermediate crossbars are connected to the processor crossbars and the memory crossbars. Further scalability may be achieved by inserting additional layers of crossbar switches.

Figure 7:
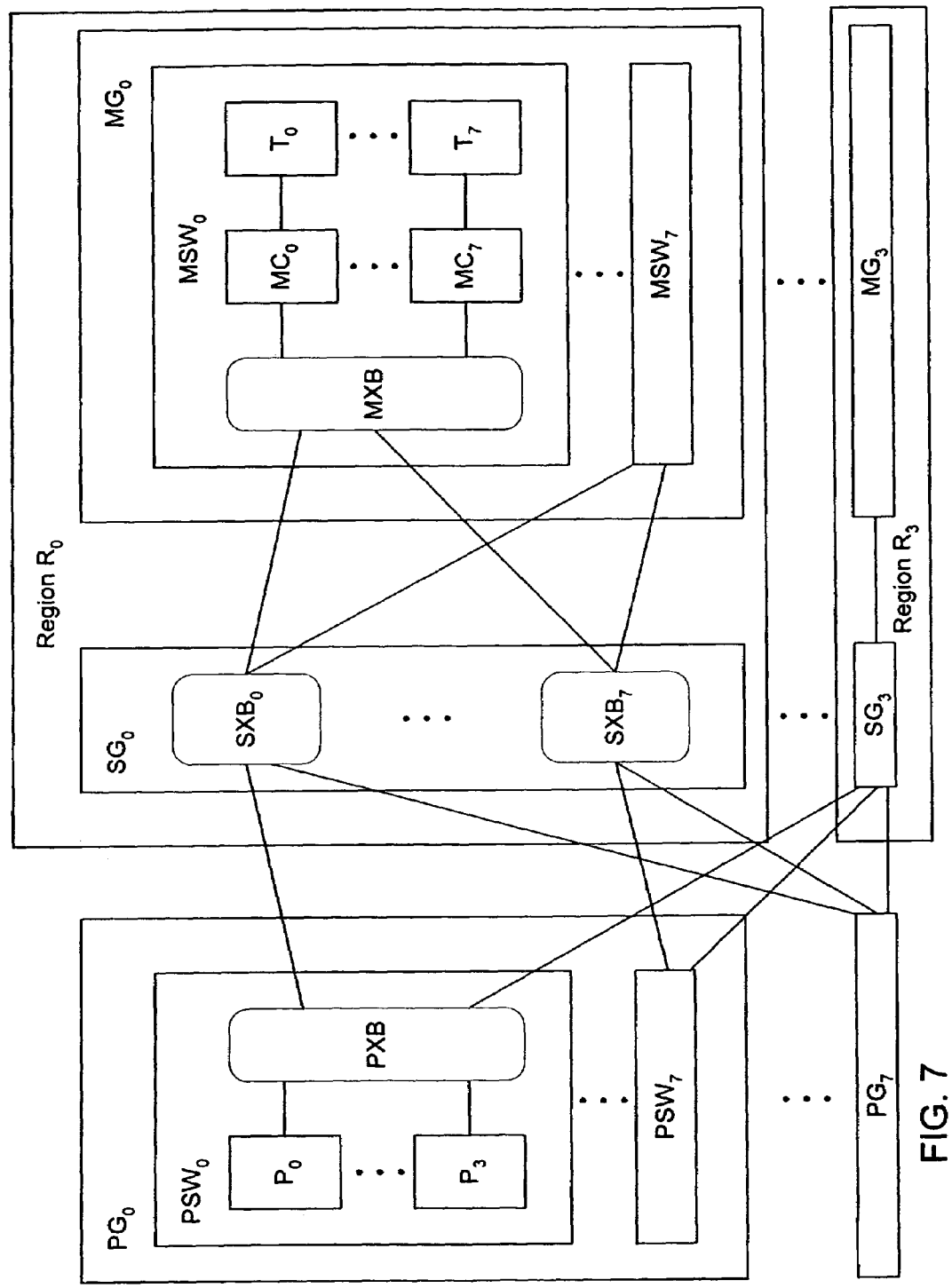
FIG. 7 shows a plurality of processor groups connected to a plurality of regions.

FIG. 7 illustrates one implementation. As shown in FIG. 7, a plurality of processor groups $PG_0$ through $PG_7$ is connected to a plurality of regions $R_0$ through $R_3$. Each region R includes a memory group MG connected to a switch group SG. For example, region $R_0$ includes a memory group $MG_0$ connected to a switch group $SG_0$, while region $R_3$ includes a memory group $MG_3$ connected to a switch group $SG_3$.

Each processor group PG includes a plurality of processor switches $PSW_0$ through $PSW_7$. Each processor switch PSW includes a plurality of processors $P_0$ through $P_3$. Each processor P is connected to a processor crossbar PXB. In one implementation, each of processors $P_0$ through $P_3$ performs a different graphics rendering function. In one implementation, $P_0$ is a triangle processor, $P_1$ is a triangle intersoctor, $P_2$ is a ray processor, and $P_3$ is a grid processor.

Each switch group SG includes a plurality of switch crossbars $SXB_0$ through $SXB_7$. Each processor crossbar PXB is connected to one switch crossbar SXB in each switch group SG. Each switch crossbar SXB in a switch group SG is connected to a different processor crossbar PXB in a processor group PG. For example, the processor crossbar PXB in processor switch $PSW_0$ is connected to switch crossbar $SXB_0$ in switch group $SG_0$, while the processor crossbar in processor switch $PSW_7$ is connected to switch crossbar $SXB_7$ in switch group $SG_0$.

Each memory switch MSW includes a plurality of memory controllers $MC_0$ through $MC_7$. Each memory controller MC is connected to a memory crossbar MXB by an internal bus. Each memory controller MC is also connected to one of a plurality of memory tracks $T_0$ through $T_7$. Each memory track T includes a plurality of memory banks. Each memory track T can be implemented as a conventional memory device such as a SDRAM.

Each memory group MG is connected to one switch group SG. In particular, each memory crossbar MXB in a memory group MG is connected to every switch crossbar SXB in the corresponding switch group SG.

Processor crossbars PXB provide full crossbar interconnection between processors P and switch crossbars SXB. Memory crossbars MXB provide full crossbar interconnection between memory controllers MC and switch crossbars SXB. Switch crossbars SXB provide full crossbar interconnection between processor crossbars PXB and memory crossbars MXB.

In one implementation, each of processor switches PSW, memory switches MSW and switch crossbars SXB is fabricated as a separate semiconductor chip. In one implementation, each processor switch PSW is fabricated as a single semiconductor chip, each switch crossbar SXB is fabricated as two or more semiconductor chips that operate in parallel, each memory crossbar MXB is fabricated as two or more semiconductor chips that operate in parallel, and each memory track T is fabricated as a single semiconductor chip. One advantage of each of these implementations is that the number of off-chip interconnects is minimized.

Figure 8:
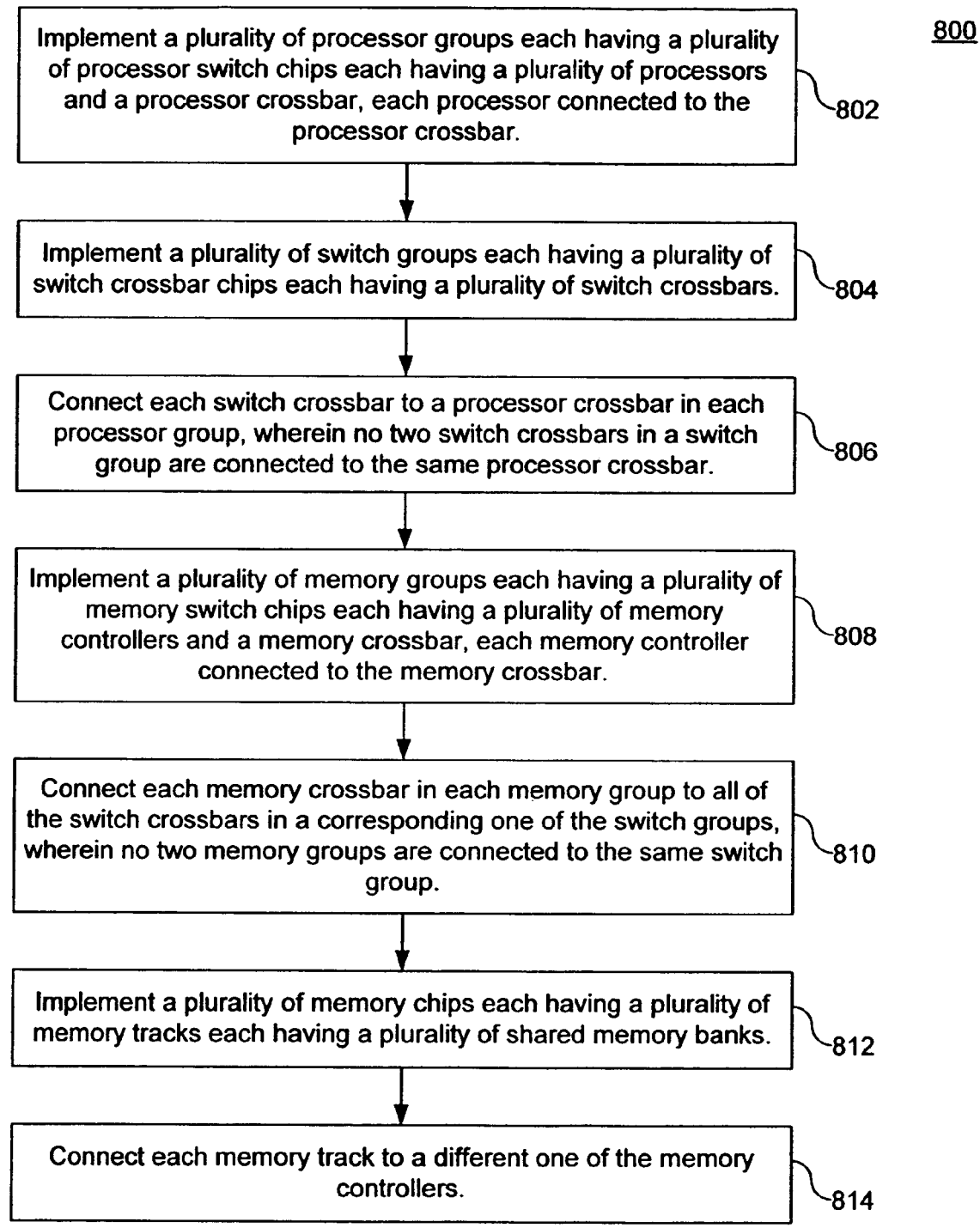
FIG. 8 illustrates a process 800 according to one implementation.

FIG. 8 illustrates a process 800 according to one implementation. The process begins by implementing one or more processor switch chips (step 602). According to one implementation, a processor switch chip includes one or more processors and a processor crossbar switch. The process continues by implementing one or more memory switch chips (step 604). According to one implementation, a memory switch chip includes one or more memory controllers and a memory crossbar switch. In some cases, one or more memory banks may be implemented on the memory switch chip. The process continues by interconnecting one or more of the processor switch chips with one or more of the memory switch chips (step 606).

In one implementation of process 600, the processor switch chips and memory switch chips are connected by connecting the processor crossbars to the memory crossbars, according to the current invention. However, for additional scalability, one or more intermediate crossbars may be implemented. In this case, the processor crossbar switches may be connected to the intermediate crossbars are connected to the processor crossbars and the memory crossbars. Further scalability may be achieved by inserting additional layers of crossbar switches.

Figure 9:
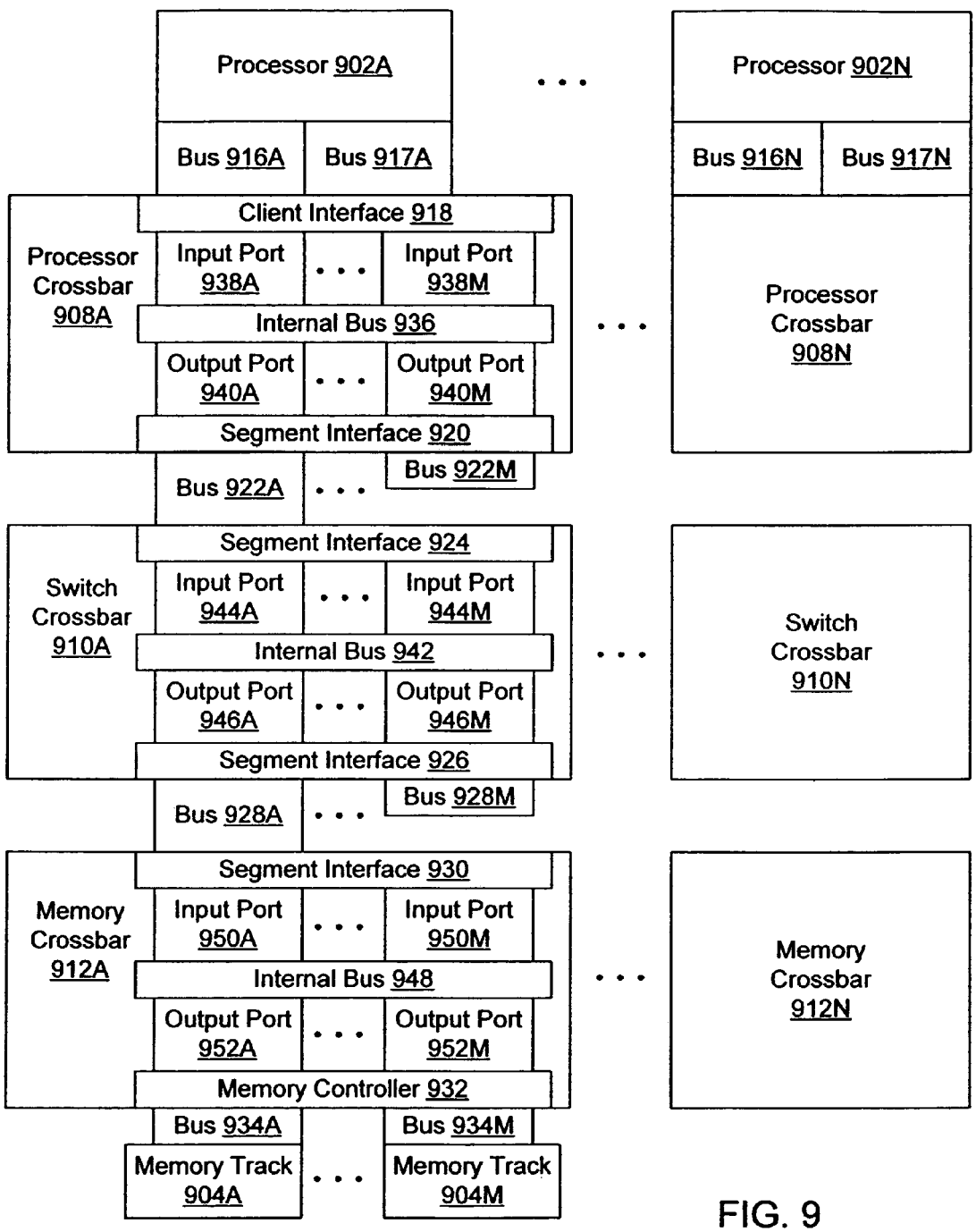
FIG. 9 shows a plurality of processors coupled to a plurality of memory tracks by a switch having three layers according to one implementation: a processor crossbar layer, a switch crossbar layer, and a memory crossbar layer.

Referring to FIG. 9, a plurality of processors 902A through 902N is coupled to a plurality of memory tracks 904A through 904M by a switch having three layers: a processor crossbar layer, a switch crossbar layer, and a memory crossbar layer. The processor crossbar layer includes a plurality of processor crossbars 908A through 908N. The switch crossbar layer includes a plurality of switch crossbars 910A through 910N. The memory crossbar layer includes a plurality of memory crossbars 912A through 912N. In one implementation, N=124. In other implementations, N takes on other values, and can take on different values for each type of crossbar.

Each processor 902 is coupled by a pair of busses 916 and 917 to one of the processor crossbars 908. For example, processor 902A is coupled by busses 916A and 917A to processor crossbar 908A. In a similar manner, processor 902N is coupled by busses 916N and 917N to processor crossbar 908N. In one implementation, each of busses 916 and 917 includes many point-to-point connections.

Each processor crossbar 908 includes a plurality of input ports 938A through 938M, each coupled to a bus 916 or 917 by a client interface 918. For example, client interface 918 couples input port 938A in processor crossbar 908A to bus 916A, and couples input port 938M in processor crossbar 908A to bus 917A. In one implementation, M=8. In other implementations, M takes on other values, and can take on different values for each type of port, and can differ from crossbar to crossbar.

Each processor crossbar 908 also includes a plurality of output ports 940A through 940M. Each of the input ports 938 and output ports 940 are coupled to an internal bus 936. In one implementation, each bus 936 includes many point-to-point connections. Each output port 940 is coupled by a segment interface 920 to one of a plurality of busses 922A through 922M. For example, output port 940A is coupled by segment interface 920 to bus 922A. Each bus 922 couples processor crossbar 908A to a different switch crossbar 910. For example, bus 922A couples processor crossbar 908A to switch crossbar 910A. In one implementation, busses 922 include many point-to-point connections.

Each switch crossbar 910 includes a plurality of input ports 944A through 944M, each coupled to a bus 922 by a segment interface 924. For example, input port 944A in switch crossbar 910A is coupled to bus 922A by segment interface 924.

Each switch crossbar 910 also includes a plurality of output ports 946A through 946M. Each of the input ports 944 and output ports 946 are coupled to an internal bus 942. In one implementation, each bus 942 includes many point-to-point connections. Each output port 946 is coupled by a segment interface 926 to one of a plurality of busses 928A through 928M. For example, output port 946A is coupled by segment interface 926 to bus 928A. Each bus 928 couples switch crossbar 910A to a different memory crossbar 912. For example, bus 928A couples switch crossbar 910A to memory crossbar 912A. In one implementation, each of busses 928 includes many point-to-point connections.

Each memory crossbar 912 includes a plurality of input ports 950A through 950M, each coupled to a bus 928 by a segment interface 930. For example, input port 950A in memory crossbar 912A is coupled to bus 928A by segment interface 930.

Each memory crossbar 912 also includes a plurality of output ports 952A through 952M. Each of the input ports 950 and output ports 952 are coupled to an internal bus 948. In one implementation, each bus 948 includes many point-to-point connections. Each output port 952 is coupled by a memory controller 932 to one of a plurality of busses 934A through 934M. For example, output port 952A is coupled by memory controller 932 to bus 934A. Each of busses 934A through 934M couples memory crossbar 912A to a different one of memory tracks 904A through 904M. Each memory track 904 includes one or more synchronous dynamic random access memories (SDRAMs), as discussed below. In one implementation, each of busses 934 includes many point-to-point connections.

In one implementation, each of busses 916, 917, 922, 928, and 934 is a high-speed serial bus where each transaction can include one or more clock cycles. In another implementation, each of busses 916, 917, 922, 928, and 934 is a parallel bus. Conventional flow control techniques can be implemented across each of busses 916, 922, 928, and 934. For example, each of client interface 918, memory controller 932, and segment interfaces 920, 924, 926, and 930 can include buffers and flow control signaling according to conventional techniques.

In one implementation, each crossbar 908, 910, 912 is implemented as a separate semiconductor chip. In one implementation, processor crossbar 908 and processor 902 are implemented together as a single semiconductor chip. In one implementation, each of switch crossbar 910 and memory crossbar 912 is implemented as two or more chips that operate in parallel, as described below.

Processor

Figure 10:
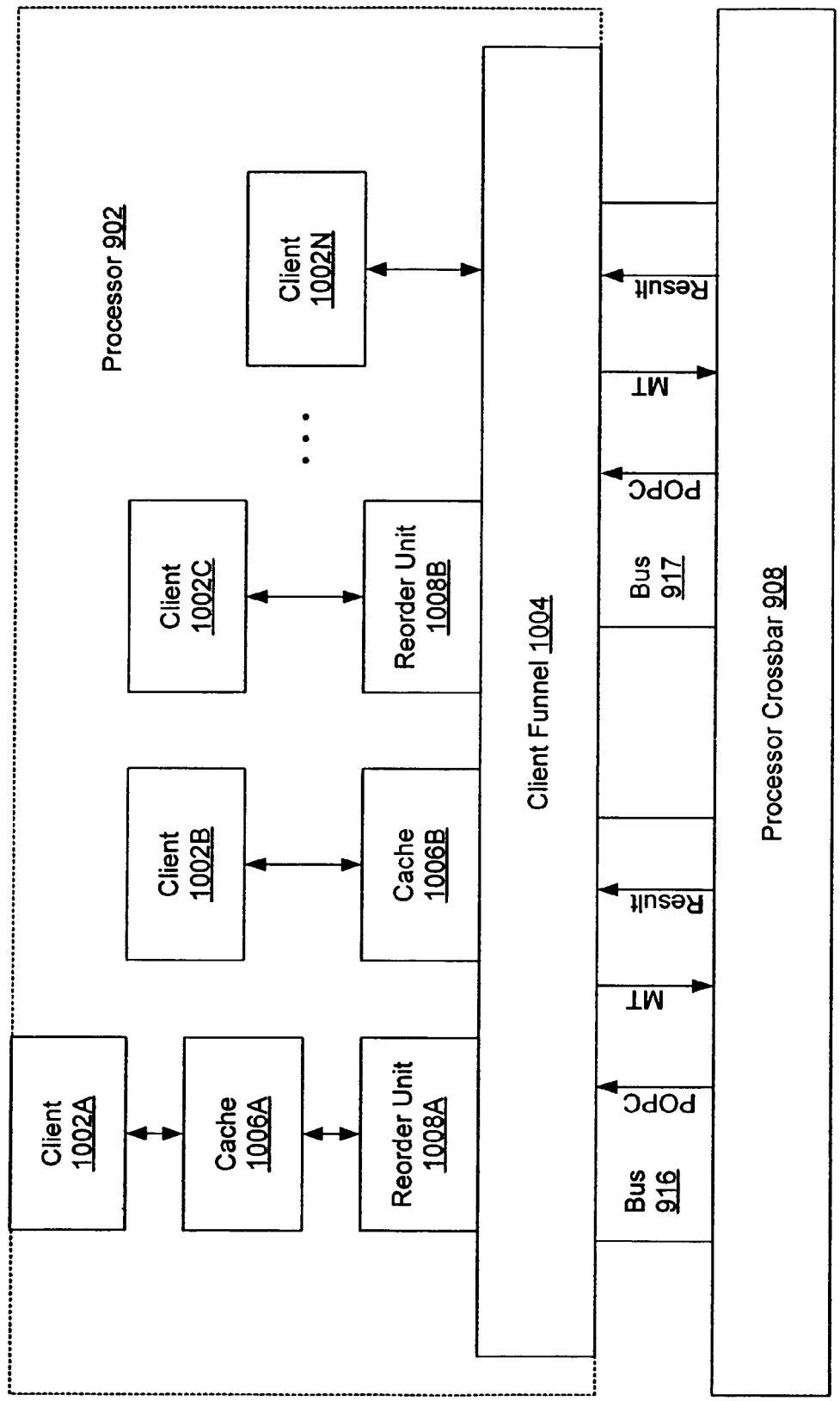
FIG. 10 shows a processor that includes a plurality of clients and a client funnel according to one implementation.

Referring to FIG. 10, in one implementation processor 902 includes a plurality of clients 1002 and a client funnel 1004. Each client 1002 can couple directly to client funnel 1004 or through one or both of a cache 1006 and a reorder unit 1008. For example, client 1002A is coupled to cache 1006A, which is coupled to reorder unit 1008A, which couples to client funnel 1004. As another example, client 1002B is coupled to cache 1006B, which couples to client funnel 1004. As another example, client 1002C couples to reorder unit 1008B, which couples to client funnel 1004. As another example, client 1002N couples directly to client funnel 1004.

Clients 1002 manage memory requests from processes executing within processor 902. Clients 1002 collect memory transactions (MT) destined for memory. If a memory transaction cannot be satisfied by a cache 1006, the memory transaction is sent to memory. Results of memory transactions (Result) may return to client funnel 1004 out of order. Reorder unit 1008 arranges the results in order before passing them to a client 1002.

Each input port 938 within processor crossbar 908 asserts a POPC signal when that input port 938 can accept a memory transaction. In response, client funnel 1004 sends a memory transaction to that input port 938 if client funnel 1004 has any memory transactions destined for that input port 938.

Processor Crossbar

Figure 11:
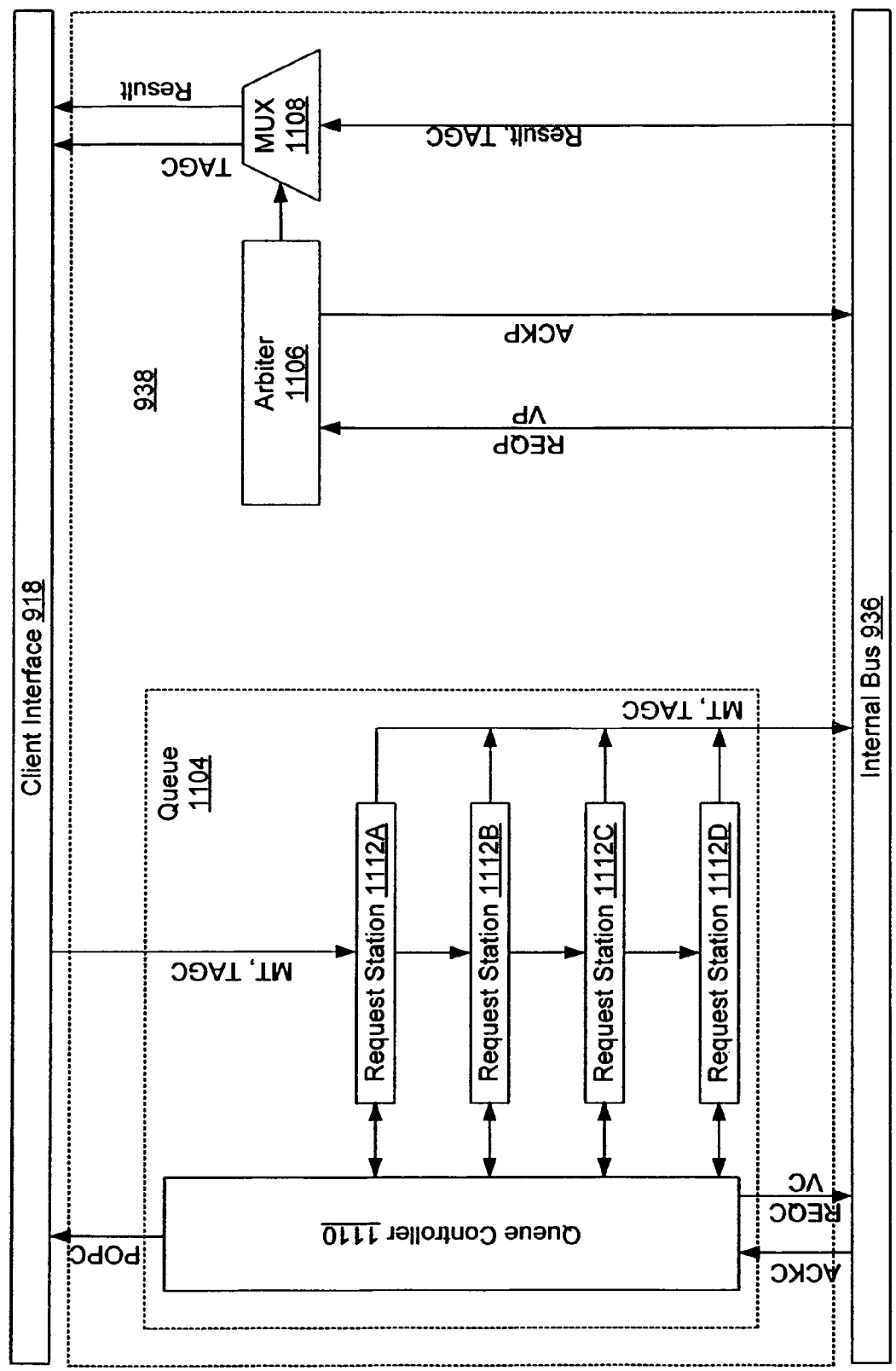
FIG. 11 shows an input port within a processor crossbar according to one implementation.

Referring to FIG. 11, an input port 938 within processor crossbar 908 includes a client interface 918, a queue 1104, an arbiter 1106, and a multiplexer (MUX) 1108. Client interface 918 and arbiter 1106 can be implemented using conventional Boolean logic devices.

Queue 1104 includes a queue controller 1110 and four request stations 1112A, 1112B, 1112C, and 1112D. In one implementation, request stations 1112 are implemented as registers. In another implementation, request stations 1112 are signal nodes separated by delay elements. Queue controller 1110 can be implemented using conventional Boolean logic devices.

Now an example operation of input port 938 in passing a memory transaction from processor 902 to switch crossbar 910 will be described with reference to FIG. 11. For clarity it is assumed that all four of request stations 1112 are valid. A request station 1112 is valid when it currently stores a memory transaction that has not been sent to switch crossbar 910, and a TAGC produced by client funnel 1004.

Internal bus 936 includes 64 data busses including 32 forward data busses and 32 reverse data busses. Each request station 1112 in each input port 938 is coupled to a different one of the 32 forward data busses. In this way, the contents of all of the request stations 1112 are presented on internal bus 936 simultaneously.

Each memory transaction includes a command and a memory address. Some memory transactions, such as write transactions, also include data. For each memory transaction, queue controller 1110 asserts a request REQC for one of output ports 940 based on a portion of the address in that memory transaction. Queue controller 1110 also asserts a valid signal VC for each request station 1112 that currently stores a memory transaction ready for transmission to switch crossbar 910.

Each output port 940 chooses zero or one of the request stations 1112 and transmits the memory transaction in that request station to switch crossbar 910, as described below. That output port 940 asserts a signal ACKC that tells the input port 938 which request station 1112 was chosen. If one of the request stations 1112 within input port 938 was chosen, queue controller 1110 receives an ACKC signal. The ACKC signal indicates one of the request stations 1112.

The request stations 1112 within a queue 1104 operate together substantially as a buffer. New memory transactions from processor 902 enter at request station 1112A and progress towards request station 1112D as they age until chosen by an output port. For example, if an output port 940 chooses request station 1112B, then request station 1112B becomes invalid and therefore available for a memory transaction from processor 902. However, rather than placing a new memory transaction in request station 1112B, queue controller 1110 moves the contents of request station 1112A into request station 1112B and places the new memory transaction in request station 1112A. In this way, the identity of a request station serves as an approximate indicator of the age of the memory transaction. In one implementation, only one new memory transaction can arrive during each transaction time, and each memory transaction can age by only one request station during each transaction time. Each transaction time can include one or more clock cycles. In other implementations, age is computed in other ways.

When queue controller 1110 receives an ACKC signal, it takes three actions. Queue controller 1110 moves the contents of the "younger" request stations 1112 forward, as described above, changes the status of any empty request stations 1112 to invalid by disasserting VC, and sends a POPC signal to client interface 918. Client interface segment 918 forwards the POPC signal across bus 916 to client funnel 1004, thereby indicating that input port 938 can accept a new memory transaction from client funnel 1004.

In response, client funnel 1004 sends a new memory transaction to the client interface 918 of that input port 938. Client funnel 1004 also sends a tag TAGC that identifies the client 1002 within processor 902 that generated the memory transaction.

Queue controller 1110 stores the new memory transaction and the TAGC in request station 1112A, and asserts signals VC and REQC for request station 1112A. Signal VC indicates that request station 1112A now has a memory transaction ready for transmission to switch crossbar 910. Signal REQC indicates through which output port 940 the memory transaction should pass.

Figure 12:
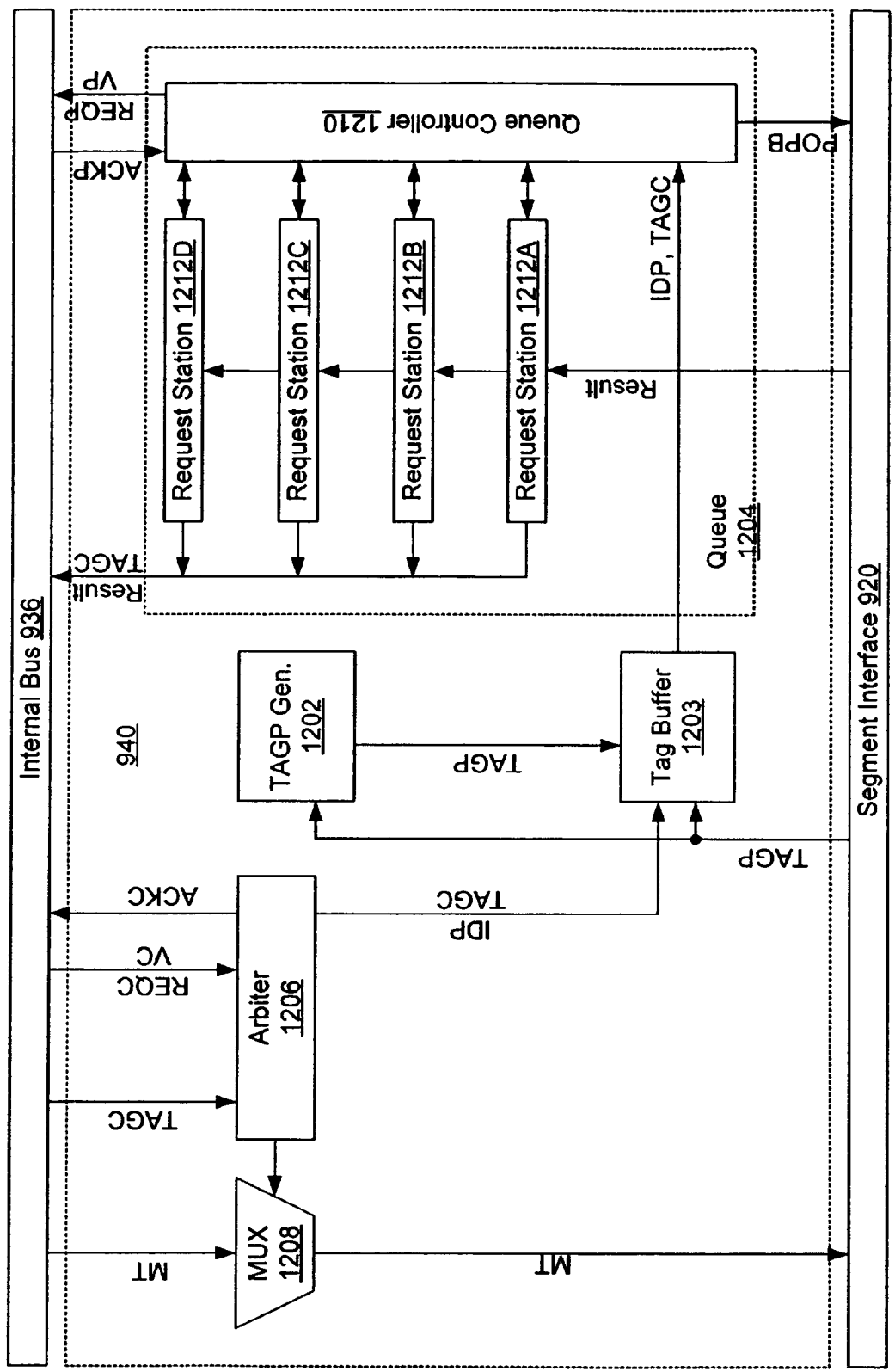
FIG. 12 shows an output port within a processor crossbar according to one implementation.

Referring to FIG. 12, an output port 940 within processor crossbar 908 includes a segment interface 920, a TAGP generator 1202, a tag buffer 1203, a queue 1204, an arbiter 1206, and a multiplexer 1208. Tag generator 1202 can be implemented as described below. Segment interface 920 and arbiter 1206 can be implemented using conventional Boolean logic devices. Tag buffer 1203 can be implemented as a conventional buffer.

Queue 1204 includes a queue controller 1210 and four request stations 1212A, 1212B, 1212C, and 1212D. In one implementation, request stations 1212 are implemented as registers. In another implementation, request stations 1212 are signal nodes separated by delay elements. Queue controller 1210 can be implemented using conventional Boolean logic devices.

Now an example operation of output port 940 in passing a memory transaction from an input port 938 to switch crossbar 910 will be described with reference to FIG. 12. Arbiter 1206 receives a REQC signal and a VC signal indicating that a particular request station 1112 within an input port 938 has a memory transaction ready for transmission to switch crossbar 910. The REQC signal identifies the request station 1112, and therefore, the approximate age of the memory transaction within that request station 1112. The VC signal indicates that the memory transaction within that request station 1112 is valid. In general, arbiter 1206 receives such signals from multiple request stations 1112 and chooses the oldest request station 1112 for transmission.

Arbiter 1206 causes multiplexer 1208 to gate the memory transaction (MT) within the chosen request station 1112 to segment interface 920. Arbiter 1206 generates a signal IDP that identifies the input port 938 within which the chosen request station 1112 resides. The identity of that input port 938 is derived from the REQC signal.

Tag generator 1202 generates a tag TAGP according to the methods described below. Arbiter 1206 receives the TAGC associated with the memory transaction. The IDP, TAGC, and TAGP are stored in tag buffer 1203. In one implementation, any address information within the memory transaction that is no longer needed (that is, the address information that routed the memory transaction to output port 940) is discarded. In another implementation that address information is passed with the memory transaction to switch crossbar 910. Arbiter 1206 asserts an ACKC signal that tells the input port 938 containing the chosen request station 1112 that the memory transaction in that request station has been transmitted to switch crossbar 910.

Now an example operation of output port 940 in passing a result of a memory transaction from switch crossbar 910 to processor 902 will be described with reference to FIG. 12. For clarity it is assumed that all four of request stations 1212 are valid. A request station 1212 is valid when it currently stores a memory transaction that has not been sent to processor 902, and a TAGC and IDP retrieved from tag buffer 1203.

As mentioned above, internal bus 936 includes 32 reverse data busses. Each request station 1212 in each output port 940 is coupled to a different one of the 32 reverse data busses. In this way, the contents of all of the request stations 1212 are presented on internal bus 936 simultaneously.

Some results, such as a result of a read transaction, include data. Other results, such as a result for a write transaction, include an acknowledgement but no data. For each result, queue controller 1210 asserts a request REQP for one of input ports 938 based on IDP. As mentioned above, IDP indicates the input port 938 from which the memory transaction prompting the result originated. Queue controller 1210 also asserts a valid signal VP for each request station 1212 that currently stores a result ready for transmission to processor 902.

Each input port 938 chooses zero or one of the request stations 1212 and transmits the result in that request station to processor 902, as described below. That input port 938 asserts a signal ACKP that tells the output port 940 which request station 1212 within that output port was chosen. If one of the request stations 1212 within output port 940 was chosen, queue controller 1210 receives an ACKP signal. The ACKP signal indicates one of the request stations 1212.

The request stations 1212 within a queue 1204 operate together substantially as a buffer. New results from processor 902 enter at request station 1212A and progress towards request station 1212D until chosen by an input port 938. For example, if an input port 938 chooses request station 1212B, then request station 1212B becomes invalid and therefore available for a new result from switch crossbar 910. However, rather than placing a new result in request station 1212B, queue controller 1210 moves the contents of request station 1212A into request station 1212B and places the new result in request station 1212A. In this way, the identity of a request station 1212 serves as an approximate indicator of the age of the result. In one implementation, only one new memory transaction can arrive during each transaction time, and each memory transaction can age by only one request station during each transaction time. In other implementations, age is computed in other ways.

When queue controller 1210 receives an ACKP signal, it takes three actions. Queue controller 1210 moves the contents of the "younger" request stations forward, as described above, changes the status of any empty request stations to invalid by disasserting VP, and sends a POPB signal to segment interface 920. segment interface 920 forwards the POPB signal across bus 922 to switch crossbar 910, thereby indicating that output port 940 can accept a new result from switch crossbar 910.

In response, switch crossbar 910 sends a new result, and a TAGP associated with that result, to the segment interface 920 of that output port 940. The generation of TAGP, and association of that TAGP with the result, are discussed below with reference to FIG. 13.

Tag buffer 1203 uses the received TAGP to retrieve the IDP and TAGC associated with that TAGP. TAGP is also returned to TAGP generator 1202 for use in subsequent transmissions across bus 922.

Queue controller 1210 stores the new result, the TAGP, and the IDP in request station 1212A, and asserts signals VP and REQP for request station 1212A. Signal VP indicates that request station 1212A now has a result ready for transmission to processor 902. Signal REQP indicates through which input port 938 the result should pass.

Now an example operation of input port 938 in passing a result from an output port 940 to processor 902 will be described with reference to FIG. 11. Arbiter 1106 receives a REQP signal and a VP signal indicating that a particular request station 1212 within an output port 940 has a result ready for transmission to processor 902. The REQP signal identifies the request station 1212, and therefore, the approximate age of the result within that request station 1212. The VP signal indicates that the memory transaction within that request station 1212 is valid. In general, arbiter 1106 receives such signals from multiple request stations 1212 and chooses the oldest request station 1212 for transmission.

Arbiter 1106 causes multiplexer 1108 to gate the result and associated TAGC to client interface 918. Arbiter 1106 also asserts an ACKP signal that tells the output port 940 containing the chosen request station 1212 that the result in that request station has been transmitted to processor 902.

Switch Crossbar

Figure 13:
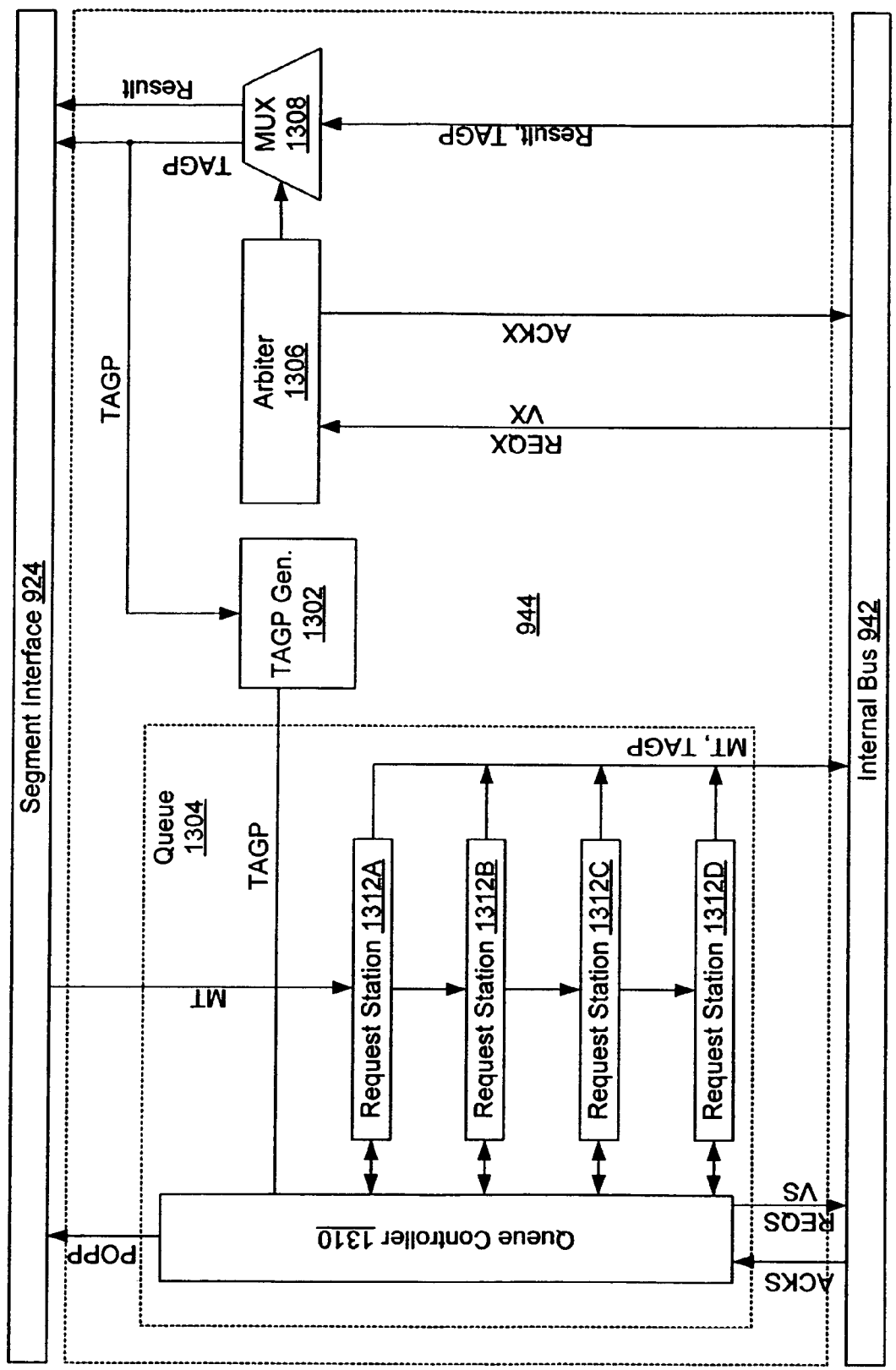
FIG. 13 shows an input port within a switch crossbar according to one implementation.

Referring to FIG. 13, an input port 944 within switch crossbar 910 includes a segment interface 924, a TAGP generator 1302, a queue 1304, an arbiter 1306, and a multiplexer 1308. TAGP generator 1302 can be implemented as described below. Segment interface 924 and arbiter 1306 can be implemented using conventional Boolean logic devices.

Queue 1304 includes a queue controller 1310 and four request stations 1312A, 1312B, 1312C, and 1312D. In one implementation, request stations 1312 are implemented as registers. In another implementation, request stations 1312 are signal nodes separated by delay elements. Queue controller 1310 can be implemented using conventional Boolean logic devices.

Now an example operation of input port 944 in passing a memory transaction from processor crossbar 908 to memory crossbar 912 will be described with reference to FIG. 13. For clarity it is assumed that all four of request stations 1312 are valid. A request station 1312 is valid when it currently stores a memory transaction that has not been sent to memory crossbar 912, and a TAGP produced by TAGP generator 1302.

Internal bus 942 includes 64 data busses including 32 forward data busses and 32 reverse data busses. Each request station 1312 in each input port 944 is coupled to a different one of the 32 forward data busses. In this way, the contents of all of the request stations 1312 are presented on internal bus 942 simultaneously.

Each memory transaction includes a command and a memory address. Some memory transactions, such as write transactions, also include data. For each memory transaction, queue controller 1310 asserts a request REQS for one of output ports 946 based on a portion of the address in that memory transaction. Queue controller 1310 also asserts a valid signal VS for each request station 1312 that currently stores a memory transaction ready for transmission to memory crossbar 912.

Each output port 946 chooses zero or one of the request stations 1312 and transmits the memory transaction in that request station to memory crossbar 912, as described below. That output port 946 asserts a signal ACKS that tells the input port 944 which request station 1312 was chosen. If one of the request stations 1312 within input port 944 was chosen, queue controller 1310 receives an ACKS signal. The ACKS signal indicates one of the request stations 1312.

The request stations 1312 within a queue 1304 operate together substantially as a buffer. New memory transactions from processor crossbar 908 enter at request station 1312A and progress towards request station 1312D as they age until chosen by an output port. For example, if an output port 946 chooses request station 1312B, then request station 1312B becomes invalid and therefore available for a memory transaction from processor crossbar 908. However, rather than placing a new memory transaction in request station 1312B, queue controller 1310 moves the contents of request station 1312A into request station 1312B and places the new memory transaction in request station 1312A. In this way, the identity of a request station serves as an approximate indicator of the age of the memory transaction. In one implementation, only one new memory transaction can arrive during each transaction time, and each memory transaction can age by only one request station during each transaction time. In other implementations, age is computed in other ways.

When queue controller 1310 receives an ACKS signal, it takes three actions. Queue controller 1310 moves the contents of the "younger" request stations 1312 forward, as described above, changes the status of any empty request stations 1312 to invalid by disasserting VS, and sends a POPP signal to segment interface 924. Segment interface 924 forwards the. POPP signal across bus 922 to processor crossbar 908, thereby indicating that input port 944 can accept a new memory transaction from processor crossbar 908.

In response, processor crossbar 908 sends a new memory transaction to the segment interface 924 of that input port 944. TAGP generator 1302 generates a TAGP for the memory transaction. Tag generators 1302 and 1202 are configured to independently generate the same tags in the same order, and are initialized to generate the same tags at substantially the same time, as discussed below. Therefore, the TAGP generated by TAGP generator 1302 for a memory transaction has the same value as the TAGP generated for that memory transaction by TAGP generator 1202. Thus the tagging technique of this implementation allows a result returned from memory tracks 904 to be matched at processor 902 with the memory transaction that produced that result.

Queue controller 1310 stores the new memory transaction and the TAGP in request station 1312A, and asserts signals VS and REQS for request station 1312A. Signal VS indicates that request station 1312A now has a memory transaction ready for transmission to memory crossbar 912. Signal REQS indicates through which output port 946 the memory transaction should pass.

Figure 14:
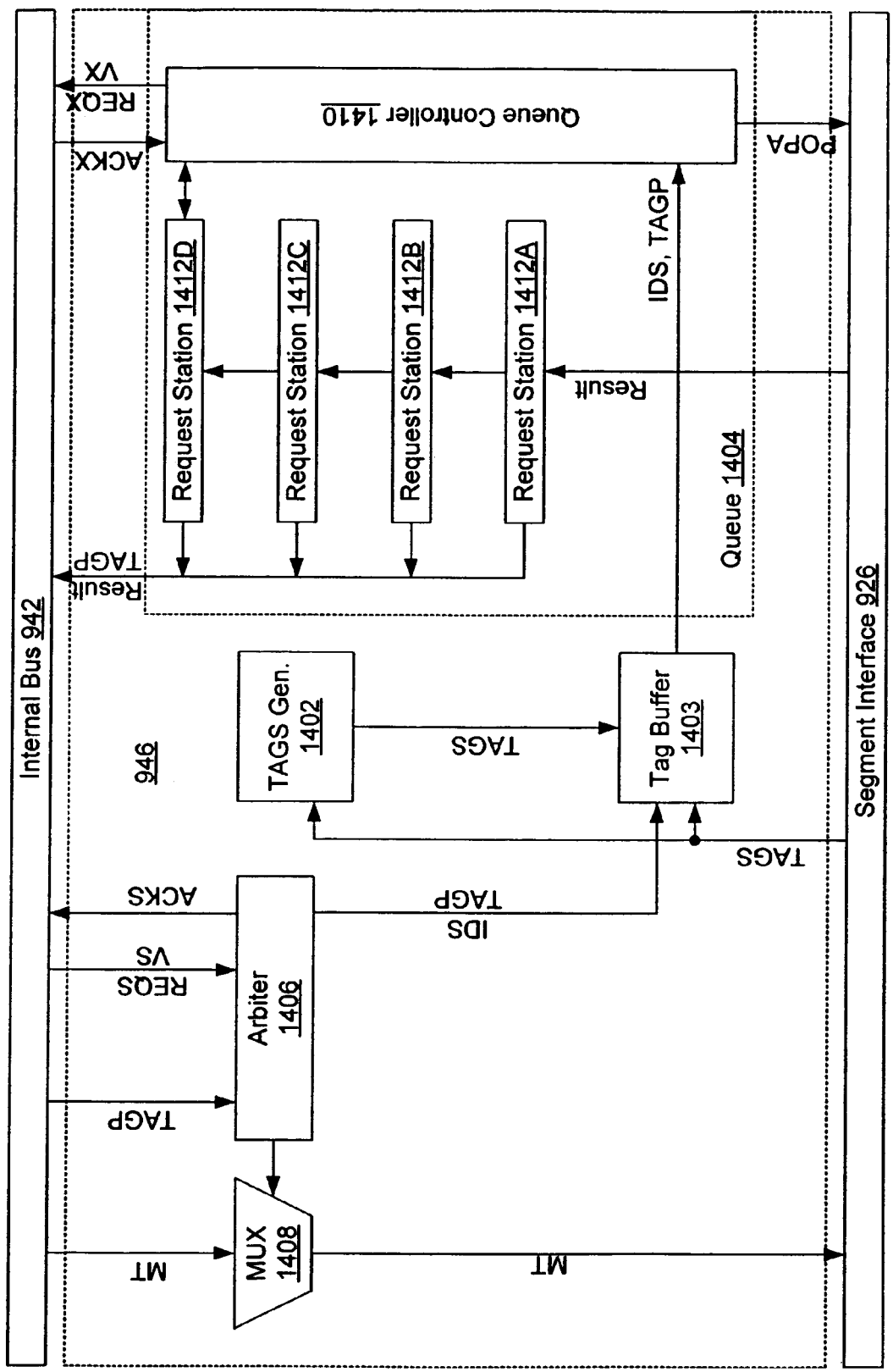
FIG. 14 shows an output port within a switch crossbar according to one implementation.

Referring to FIG. 14, an output port 946 within switch crossbar 910 includes a segment interface 926, a TAGS generator 1402, a tag buffer 1403, a queue 1404, an arbiter 1406, and a multiplexer 1408. TAGS generator 1402 can be implemented as described below. Segment interface 926 and arbiter 1406 can be implemented using conventional Boolean logic devices. Tag buffer 1403 can be implemented as a conventional buffer.

Queue 1404 includes a queue controller 1410 and four request stations 1412A, 1412B, 1412C, and 1412D. In one implementation, request stations 1412 are implemented as registers. In another implementation, request stations 1412 are signal nodes separated by delay elements. Queue controller 1410 can be implemented using conventional Boolean logic devices.

Now an example operation of output port 946 in passing a memory transaction from an input port 944 to memory crossbar 912 will be described with reference to FIG. 14. Arbiter 1406 receives a REQS signal and a VS signal indicating that a particular request station 1312 within an input port 944 has a memory transaction ready for transmission to memory crossbar 912. The REQS signal identifies the request station 1312, and therefore, the approximate age of the memory transaction within that request station 1312. The VS signal indicates that the memory transaction within that request station 1312 is valid. In general, arbiter 1406 receives such signals from multiple request stations 1312 and chooses the oldest request station 1312 for transmission.

Arbiter 1406 causes multiplexer 1408 to gate the memory transaction (MT) within the chosen request station 1312 to segment interface 926. Arbiter 1406 generates a signal IDS that identifies the input port 944 within which the chosen request station 1312 resides. The identity of that input port 944 is derived from the REQC signal.

TAGS generator 1402 generates a tag TAGS according to the methods described below. Arbiter 1406 receives the TAGP associated with the memory transaction. The IDS, TAGP, and TAGS are stored in tag buffer 1403. In one implementation, any address information within the memory transaction that is no longer needed (that is, the address information that routed the memory transaction to output port 946) is discarded. In another implementation that address information is passed with the memory transaction to memory crossbar 912. Arbiter 1406 asserts an ACKS signal that tells the input port 944 containing the chosen request station 1312 that the memory transaction in that request station has been transmitted to memory crossbar 912.

Now an example operation of output port 946 in passing a result of a memory transaction from memory crossbar 912 to processor crossbar 908 will be described with reference to FIG. 14. For clarity it is assumed that all four of request stations 1412 are valid. A request station 1412 is valid when it currently stores a memory transaction that has not been sent to processor crossbar 908, and a TAGP and IDS retrieved from tag buffer 1403.

As mentioned above, internal bus 942 includes 32 reverse data busses. Each request station 1412 in each output port 946 is coupled to a different one of the 32 reverse data busses. In this way, the contents of all of the request stations 1412 are presented on internal bus 942 simultaneously.

Some results, such as a result of a read transaction, include data. Other results, such as a result for a write transaction, include an acknowledgement but no data. For each result, queue controller 1410 asserts a request REQX for one of input ports 944 based on IDS. As mentioned above, IDS indicates the input port 944 from which the memory transaction prompting the result originated. Queue controller 1410 also asserts a valid signal VX for each request station 1412 that currently stores a result ready for transmission to processor crossbar 908.

Each input port 944 chooses zero or one of the request stations 1412 and transmits the result in that request station to processor crossbar 908, as described below. That input port 944 asserts a signal ACKX that tells the output port 946 which request station 1412 within that output port was chosen. If one of the request stations 1412 within output port 946 was chosen, queue controller 1410 receives an ACKX signal. The ACKX signal indicates one of the request stations 1412.

The request stations 1412 within a queue 1404 operate together substantially as a buffer. New results from processor crossbar 908 enter at request station 1412A and progress towards request station 1412D until chosen by an input port 944. For example, if an input port 944 chooses request station 1412B, then request station 1412B becomes invalid and therefore available for a new result from memory crossbar 912. However, rather than placing a new result in request station 1412B, queue controller 1410 moves the contents of request station 1412A into request station 1412B and places the new result in request station 1412A. In this way, the identity of a request station 1412 serves as an approximate indicator of the age of the result. In one implementation, only one new memory transaction can arrive during each transaction time, and each memory transaction can age by only one request station during each transaction time. In other implementations, age is computed in other ways.

When queue controller 1410 receives an ACKX signal, it takes three actions. Queue controller 1410 moves the contents of the "younger" request stations forward, as described above, changes the status of any empty request stations to invalid, and sends a POPA signal to segment interface 926. Segment interface 926 forwards the POPA signal across bus 922 to memory crossbar 912, thereby indicating that output port 946 can accept a new result from memory crossbar 912.

In response, memory crossbar 912 sends a new result, and a TAGS associated with that result, to the segment interface 926 of that output port 946. The generation of TAGS, and association of that TAGS with the result, are discussed below with reference to FIG. 15

Tag buffer 1403 uses the received TAGS to retrieve the IDS and TAGP associated with that TAGS. TAGS is also returned to TAGS generator 1402 for use in subsequent transmissions across bus 928.

Queue controller 1410 stores the new result, the TAGP, and the IDS in request station 1412A, and asserts signals VX and REQX for request station 1412A. Signal VX indicates that request station 1412A now has a result ready for transmission to processor crossbar 908. Signal REQX indicates through which input port 944 the result should pass.

Now an example operation of input port 944 in passing a result from an output port 946 to processor crossbar 908 will be described with reference to FIG. 13. Arbiter 1306 receives a REQX signal and a VX signal indicating that a particular request station 1412 within an output port 946 has a result ready for transmission to processor crossbar 908. The REQX signal identifies the request station 1412, and therefore, the approximate age of the result within that request station 1412. The VX signal indicates that the memory transaction within that request station 1412 is valid. In general, arbiter 1306 receives such signals from multiple request stations 1412 and chooses the oldest request station 1412 for transmission.

Arbiter 1306 causes multiplexer 1308 to gate the result and associated TAGP to segment interface 924, and to return the TAGP to TAGP generator 1302 for use with future transmissions across bus 922. Arbiter 1306 also asserts an ACKX signal that tells the output port 946 containing the chosen request station 1412 that the result in that request station has been transmitted to processor crossbar 908.

Memory Crossbar

Figure 15:
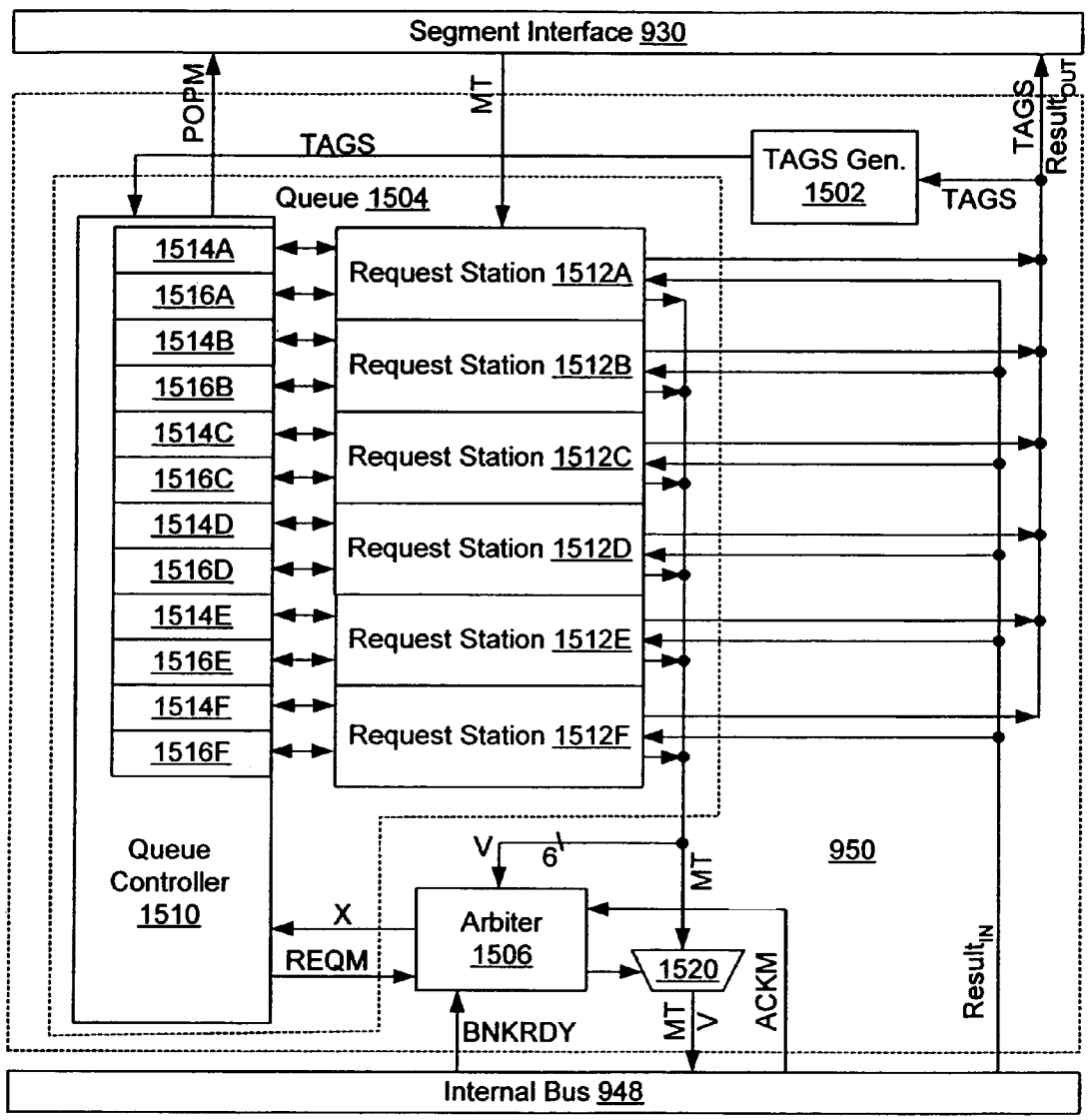
FIG. 15 shows an input port within a memory crossbar according to one implementation.

Referring to FIG. 15, an input port 950 within memory crossbar 912 is connected to a segment interface 930 and an internal bus 948, and includes a TAGS generator 1502, a queue 1504, an arbiter 1506, and multiplexer (MUX) 1520. TAGS generator 1502 can be implemented as described below. Segment interface 930 and arbiter 1506 can be implemented using conventional Boolean logic devices. Queue 1504 includes a queue controller 1510 and six request stations 1512A, 1512B, 1512C, 1512D, 1512E, and 1512F. Queue controller 1510 includes a forward controller 1514 and a reverse controller 1516 for each request station 1512. Forward controllers 1514 include forward controllers 1514A, 1514B, 1514C, 1514D, 1514E, and 1514F. Reverse controllers 1516 include forward controllers 1516A, 1516B, 1516C, 1516D, 1516E, and 1516F. Queue controller 1510, forward controllers 1514 and reverse controllers 1516 can be implemented using conventional Boolean logic devices.

Now an example operation of input port 950 in passing a memory transaction from switch crossbar 910 to a memory track 904 will be described with reference to FIG. 15. For clarity it is assumed that all six of request stations 1512 are valid. A request station 1512 is valid when it currently stores a memory transaction that has not been sent to a memory track 904, and a TAGS produced by TAGS generator 1502.

The request stations 1512 within a queue 1504 operate together substantially as a buffer. New memory transactions from switch crossbar 910 enter at request station 1512A and progress towards request station 1512F until chosen by an output port 952. For example, if an output port 952 chooses request station 1512B, then request station 1512B becomes invalid and therefore available for a memory transaction from switch crossbar 910. However, rather than placing a new memory transaction in request station 1512B, queue controller 1510 moves the contents of request station 1512A into request station 1512B and places the new memory transaction in request station 1512A. In this way, the identity of a request station serves as an approximate indicator of the age of the memory transaction. In one implementation, only one new memory transaction can arrive during each transaction time, and each memory transaction can age by only one request station during each transaction time. In other implementations, age is computed in other ways.

For each memory transaction, queue controller 1510 asserts a request REQM for one of output ports 952 based on a portion of the address in that memory transaction. Queue controller 1510 also asserts a valid signal V for each request station that currently stores a memory transaction ready for transmission to memory tracks 904.

Internal bus 942 includes 64 separate two-way private busses. Each private bus couples one input port 950 to one output port 952 so that each input port has a private bus with each output port.

Each arbiter 1506 includes eight pre-arbiters (one for each private bus). Each multiplexer 1520 includes eight pre-multiplexers (one for each private bus). Each pre-arbiter causes a pre-multiplexer to gate zero or one of the request stations 1512 to the private bus connected to that pre-multiplexer. In this way, an input port 950 can present up to six memory transactions on internal bus 948 simultaneously.

A pre-arbiter selects one of the request stations based on several criteria. The memory transaction must be valid. This information is given by the V signal. The memory transaction in the request station must be destined to the output port 952 served by the pre-arbiter. This information is given by the REQM signal. The memory bank addressed by the memory transaction must be ready to accept a memory transaction. The status of each memory bank is given by a BNKRDY signal generated by output ports 952, as described below. The prearbiter considers the age of each memory transaction as well. This information is given by the identity of the request station 1512.

Each output port 952 sees eight private data busses, each presenting zero or one memory transactions from an input port 950. Each output port 952 chooses zero or one of the memory transactions and transmits that memory transaction to memory controller 932, as described below. That output port 952 asserts a signal ACKM that tells the input port 950 which bus, and therefore which input port 950, was chosen. If one of the request stations 1512 within input port 950 was chosen, the pre-arbiter for that bus receives an ACKM signal. The ACKM signal tells the pre-arbiter that the memory transaction presented on the bus served by that pre-arbiter was transmitted to memory. The pre-arbiter remembers which request station 1512 stored that memory transaction, and sends a signal X to queue controller 1510 identifying that request station 1512.

Queue controller 1510 takes several actions when it receives a signal X. Queue controller 1510 moves the contents of the "younger" request stations forward, as described above, changes the status of any empty request stations to invalid by disasserting V, and moves the TAGS for the memory transaction just sent into a delay unit 1508.

Queue controller 1510 also sends a POPM signal to segment interface 930. Segment interface 930 forwards the POPM signal across bus 928 to switch crossbar 910, thereby indicating that input port 950 can accept a new memory transaction from switch crossbar 910.

In response, switch crossbar 910 sends a new memory transaction to the segment interface 930 of that input port 950. TAGS generator 1502 generates a TAGS for the memory transaction. TAGS generators 1502 and 1402 are configured to independently generate the same tags in the same order, and are initialized to generate the same tags at substantially the same time, as discussed below. Therefore, the TAGS generated by TAGS generator 1502 for a memory transaction has the same value as the TAGS generated for that memory transaction by TAGS generator 1402. Thus the tagging technique of this implementation allows a result returned from memory tracks 904 to be returned to the process that originated the memory transaction that produced that result.

Queue controller 1510 stores the new memory transaction and the TAGS in request station 1512A, and asserts signals V and REQM. Signal V indicates that request station 1512A now has a memory transaction ready for transmission to memory tracks 904. Signal REQM indicates through which input port 944 the result should pass.

Figure 16:
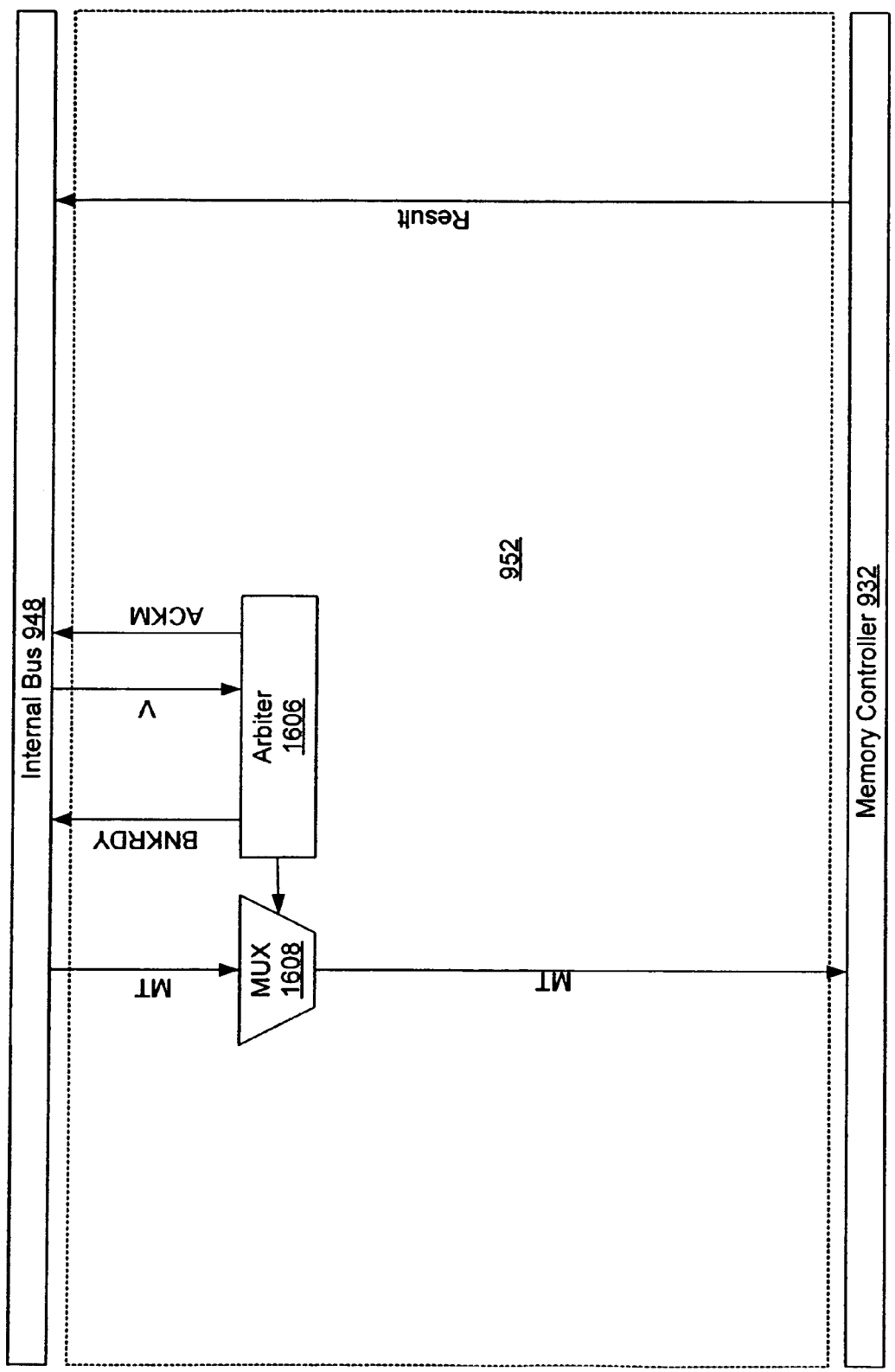
FIG. 16 shows an output port within a memory crossbar according to one implementation.

Referring to FIG. 16, an output port 952 within memory crossbar 912 includes a memory controller 932, an arbiter 1606, and a multiplexer 1608. Memory controller 932 and arbiter 1606 can be implemented using conventional Boolean logic devices.

Now an example operation of output port 952 in passing a memory transaction from an input port 950 to a memory track 904 will be described with reference to FIG. 16. Arbiter 1606 receives one or more signals V each indicating that a request station 1512 within an input port 950 has presented a memory transaction on its private bus with that output port 952 for transmission to memory tracks 904. The V signal indicates that the memory transaction within that request station 1512 is valid. In one implementation, arbiter 1606 receives such signals from multiple input ports 950 and chooses one of the input ports 950 based on a fairness scheme.

Arbiter 1606 causes multiplexer 1608 to gate any data within the chosen request station to memory controller 932. Arbiter 1606 also gates the command and address within the request station to memory controller 932. Arbiter 1606 asserts an ACKM signal that tells the input port 950 containing the chosen request station 1512 that the memory transaction in that request station has been transmitted to memory tracks 904.

Now an example operation of output port 952 in passing a result of a memory transaction from memory tracks 904 to switch crossbar 910 will be described with reference to FIG. 16. When a result arrives at memory controller 932, memory controller 932 sends the result ($Result_{IN}$) over internal bus 948 to the input port 950 that transmitted the memory transaction that produced that result. Some results, such as a result of a read transaction, include data. Other results, such as a result for a write transaction, include an acknowledgement but no data.

Now an example operation of input port 950 in passing a result from an output port 952 to switch crossbar 910 will be described with reference to FIG. 15. Each result received over internal bus 948 is placed in the request station from which the corresponding memory transaction was sent. Each result and corresponding TAGS progress through queue 1504 towards request station 1512F until selected for transmission to switch crossbar 910.

Figure 17:
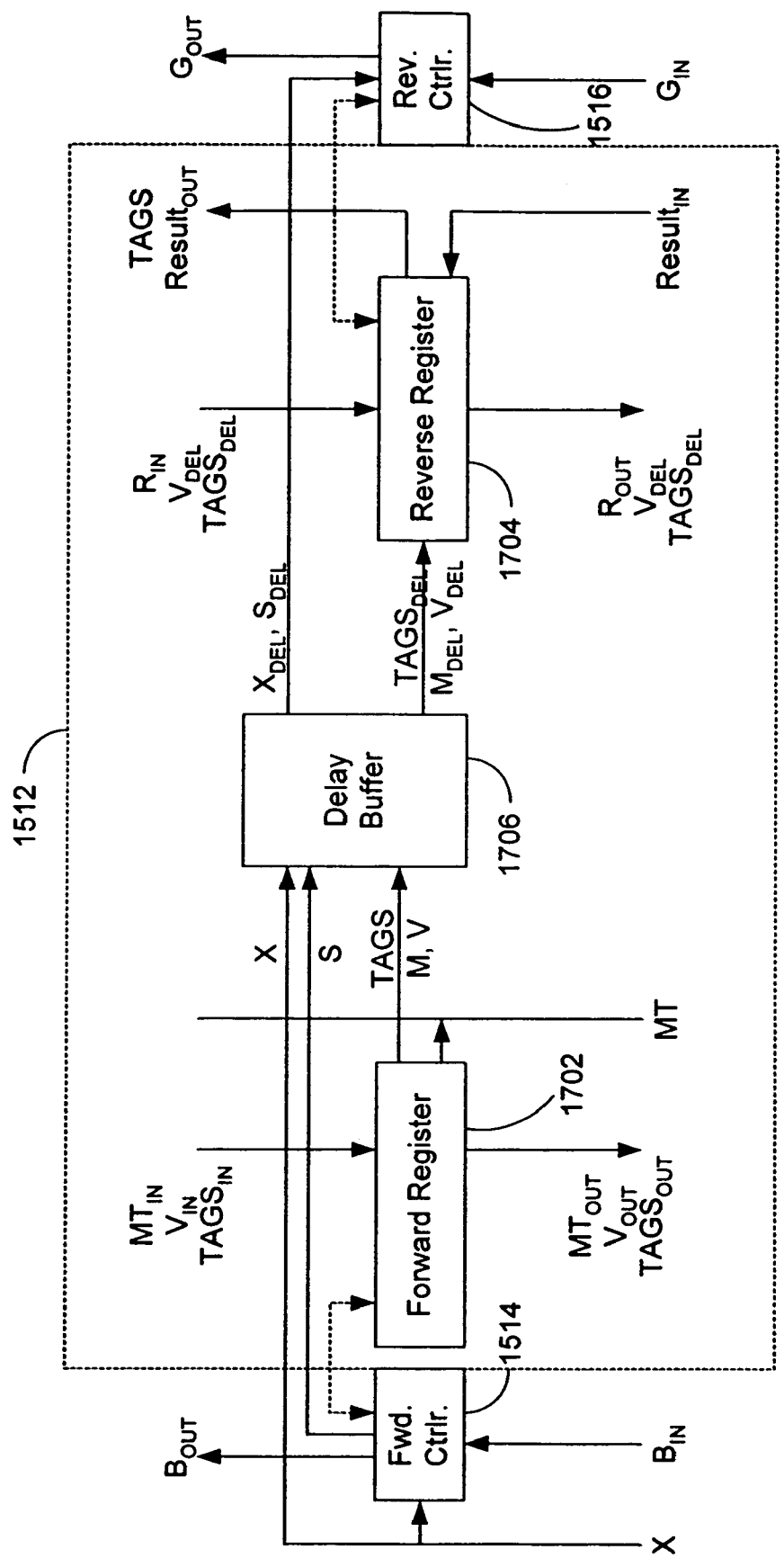
FIG. 17 depicts a request station according to one implementation.

FIG. 17 depicts a request station 1512 according to one implementation. Request station 1512 includes a forward register 1702, a reverse register 1704, and a delay buffer 1706. Forward register 1702 is controlled by a forward controller 1514. Reverse register 1704 is controlled by a reverse controller 1516.

Queue 1504 operates according to transaction cycles. A transaction cycle includes a predetermined number of clock cycles. Each transaction cycle queue 1504 may receive a new memory transaction (MT) from a switch crossbar 910. As described above, new memory transactions (MT) are received in request station 1512A, and age through queue 1504 each transaction cycle until selected by a signal X. Request station 1512A is referred to herein as the "youngest" request station, and includes the youngest forward and reverse controllers, the youngest forward and reverse registers, and the youngest delay buffer. Similarly, request station 1512F is referred to herein as the "oldest" request station, and includes the oldest forward and reverse controllers, the oldest forward and reverse registers, and the oldest delay buffer.

The youngest forward register receives new memory transactions ($MT_{IN}$) from switch crossbar 910. When a new memory transaction $MT_{IN}$ arrives in the youngest forward register, the youngest forward controller sets the validity bit $V_{IN}$ for the youngest forward register and places a tag TAGS from tag generator 1502 into the youngest forward register. In this description a bit is set by making it a logical one ("1") and cleared by making it a logical zero ("0").

When set, signal X indicates that the contents of forward register 1702 have been transmitted to a memory track 904.

Each forward controller 1514 generates a signal $B_{OUT}$ every transaction cycle where $$B_{OUT} = VB_{IN}\overline{X} \qquad (1)$$

where $B_{OUT}$ is used by a younger forward register as $B_{IN}$ and $B_{IN}=0$ for the oldest forward register.

Each forward controller 1514 shifts into its forward register 1702 the contents of an immediately younger forward register when:

$$S=1 \qquad (2)$$

where $$S=\overline{V}+X+\overline{B_{IN}} \qquad (3)$$

where V indicates that the contents of the forward register 1702 are valid and X indicates that the memory transaction in that forward register 1702 has been placed on internal bus 948 by arbiter 1506. Note that X is only asserted for a forward register 1702 when that forward register is valid (that is, when the validity bit V is set for that forward register). The contents of each forward register include a memory transaction MT, a validity bit V, and a tag TAGS.

Referring to FIG. 17, the contents being shifted into forward register 1702 from an immediately younger forward register are denoted $MT_{IN}$, $V_{IN}$, and $TAGS_{IN}$, while the contents being shifted out of forward register 1702 to an immediately older forward register are denoted $MT_{OUT}$, $V_{OUT}$, and $TAGS_{OUT}$.

The validity bit V for each forward register 1702 is updated each transaction cycle according to $$V = V\overline{X} + SV_{IN} \qquad (4)$$

Each forward controller 1514 copies TAGS, V, and M from its forward register 1702 into its delay buffer 1706 every transaction cycle. M is the address of the request station 1512. Each forward controller 1514 also copies X and S into its delay buffer 1706 every transaction cycle. Each delay buffer 1706 imposes a predetermined delay on its contents that is equal to the known predetermined time that elapses between sending a memory transaction to a memory track 904 and receiving a corresponding result from that memory track 904.

Each transaction cycle, an $X_{DEL}$, $V_{DEL}$, $S_{DEL}$, $M_{DEL}$ and $TAGS_{DEL}$ emerge from delay buffer 1706. $X_{DEL}$ is X delayed by delay buffer 1706. $V_{DEL}$ is V delayed by delay buffer 1706. $S_{DEL}$ is S delayed by delay buffer 1706. When $X_{DEL}$ is set, reverse register 1704 receives a result $Result_{IN}$ selected according to $M_{DEL}$ from a memory track 904, and a $TAGS_{DEL}$, $V_{DEL}$ and $S_{DEL}$ from delay buffer 1706, the known predetermined period of time after sending the corresponding memory transaction from forward register 1702 to that memory track 904.

Each transaction cycle, reverse controller 1516 generates a signal $G_{OUT}$ where $$G_{OUT} = V_{DEL} G_{IN} \qquad (5)$$

where $G_{OUT}$ is used by a younger reverse register as $G_{IN}$ and $G_{IN}=1$ for the oldest reverse register.

A reverse register 1704 sends its contents (a result Result$_{OUT}$ and a tag TAGS) to switch crossbar 910 when $$\overline{V_{DEL}} G_{IN} = 1 \qquad (6)$$

Each reverse controller 1516 shifts into its reverse register 1704 the contents of an immediately younger reverse register when:

$$S_{DEL} = 1 \qquad (7)$$

The contents of each reverse register include a result Result, a tag TAGS$_{DEL}$, and delayed validity bit $V_{DEL}$. Referring to FIG. 17, the result being shifted into reverse register 1704 from an immediately younger reverse register is denoted $R_{IN}$, while the result being shifted out of reverse register 1704 to an immediately older reverse register is denoted $R_{OUT}$.

Memory Arbitration

Figure 18:
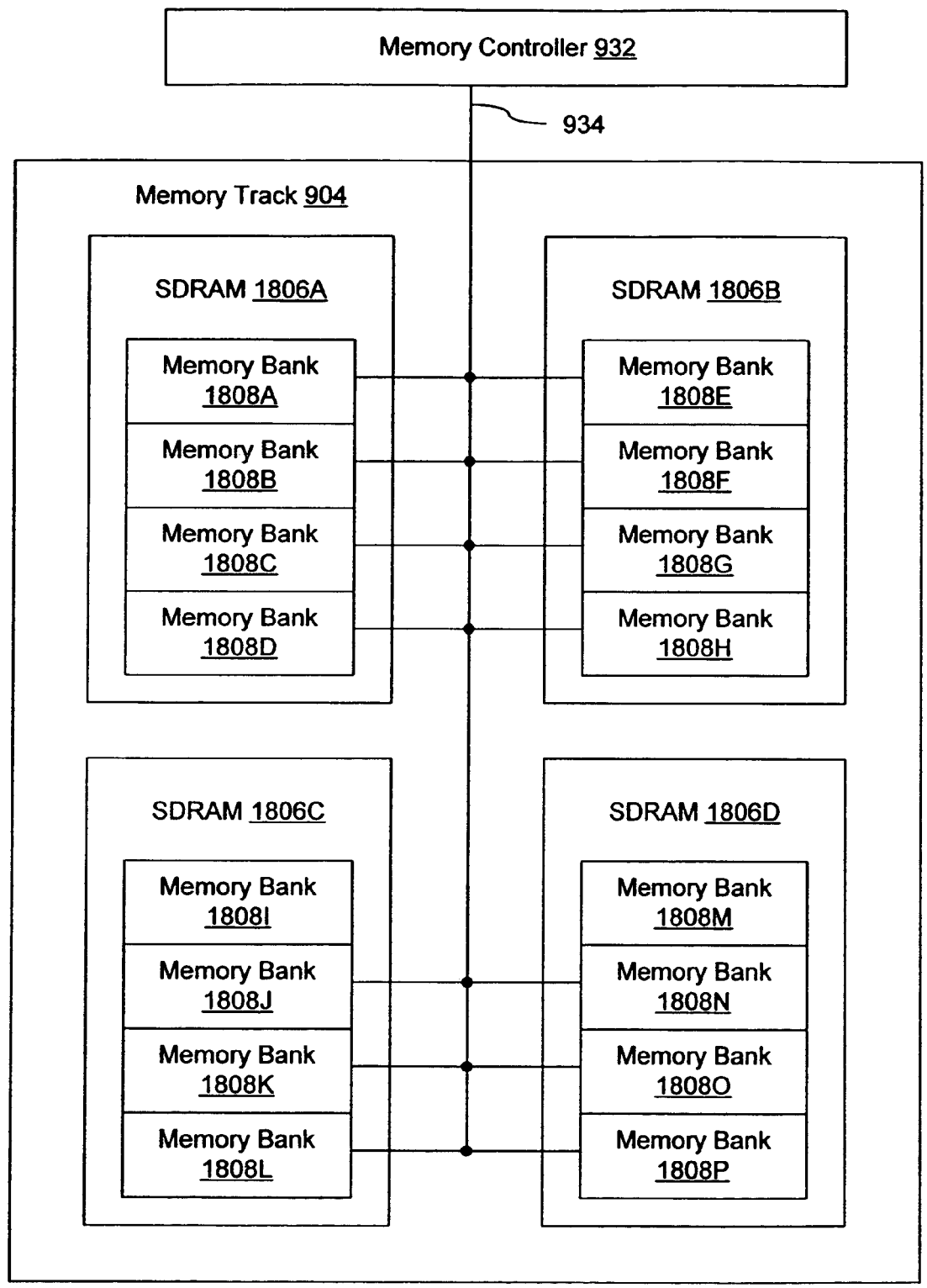
FIG. 18 depicts a memory track according to one implementation.

Each memory controller 932 controls a memory track 904 over a memory bus 934. Referring to FIG. 18, each memory track 904 includes four SDRAMs 1806A, 1806B, 1806C, and 1806D. Each SDRAM 1806 includes four memory banks 1808. SDRAM 1806A includes memory banks 1808A, 1808B, 1808C, and 1808D. SDRAM 1806B includes memory banks 1808E, 1808F, 1808G, and 1808H. SDRAM 1806C includes memory banks 1808I, 1808J, 1808K, and 1808L. SDRAM 1806D includes memory banks 1808M, 1808N, 1808O, and 1808P.

The SDRAMs 1806 within a memory track 904 operate in pairs to provide a double-wide data word. For example, memory bank 1808A in SDRAM 1806A provides the least-significant bits of a data word, while memory bank 1808E in SDRAM 1806B provides the most-significant bits of that data word.

Memory controller 932 operates efficiently to extract the maximum bandwidth from memory track 904 by exploiting two features of SDRAM technology. First, the operations of the memory banks 1808 of a SDRAM 1806 can be interleaved in time to hide overhead such as precharge and access time. Second, the use of autoprecharge makes the command and data traffic equal. For an SDRAM, an eight-byte transfer operation requires two commands (activate and read/write) and two data transfers (four clock phases).

Figure 19:
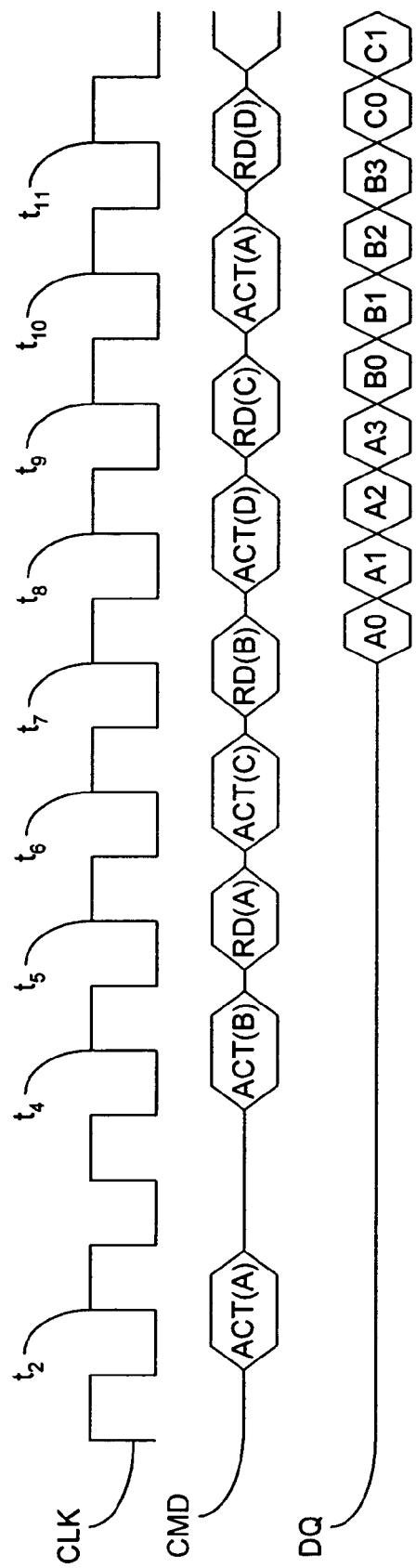
FIG. 19 depicts three timelines for an example operation of an SDRAM according to one implementation.

FIG. 19 depicts three timelines for an example operation of SDRAM 1806A. A clock signal CLK operates at a frequency compatible with SDRAM 1806A. A command bus CMD transports commands to SDRAM 1806A across memory bus 934. A data bus DQ transports data to and from SDRAM 1806A across memory bus 934.

FIG. 19 depicts the timing of four interleaved read transactions. The interleaving of other commands such as write commands will be apparent to one skilled in the relevant arts after reading this description. SDRAM 1806A receives an activation command ACT(A) at time $t_2$. The activation command prepares bank 1808A of SDRAM 1806A for a read operation. The receipt of the activation command also begins an eight-clock period during which bank 1808A is not available to accept another activation.

During this eight-clock period, SDRAM 1806A receives a read command RD(A) at $t_5$. SDRAM 1806A transmits the data A0, A1, A2, A3 requested by the read command during the two clock cycles between times $t_7$ and $t_9$. SDRAM 1806A receives another activation command ACT(A) at time $t_{10}$.

Three other read operations are interleaved with the read operation just described. SDRAM 1806A receives an activation command ACT(B) at time $t_4$. The activation command prepares bank 1808B of SDRAM 1806A for a read operation. The receipt of the activation command also begins an eight-clock period during which bank 1808B is not available to accept another activation.

During this eight-clock period, SDRAM 1806A receives a read command RD(B) at $t_7$. SDRAM 1806A transmits the data B0, B1, B2, B3 requested by the read command during the two clock cycles between times $t_9$ and $t_{11}$.

SDRAM 1806A receives an activation command ACT(C) at time $t_6$. The activation command prepares bank 1808C of SDRAM 1806A for a read operation. The receipt of the activation command also begins an eight-clock period during which bank 1808C is not available to accept another activation.

During this eight-clock period, SDRAM 1806A receives a read command RD(C) at $t_9$. SDRAM 1806A transmits the data C0, C1, and so forth, requested by the read command during the two clock cycles beginning with $t_{11}$.

SDRAM 1806A receives an activation command ACT(D) at time $t_8$. The activation command prepares bank 1808D of SDRAM 1806A for a read operation. The receipt of the activation command also begins an eight-clock period during which bank 1808D is not available to accept another activation.

During this eight-clock period, SDRAM 1806A receives a read command RD(D) at $t_{11}$. SDRAM 1806A transmits the data requested by the read command during two subsequent clock cycles in a manner similar to that describe above. As shown in FIG. 19, three of the eight memory banks 1808 of a memory track 904 are unavailable at any given time, while the other five memory banks 1808 are available.

Figure 20:
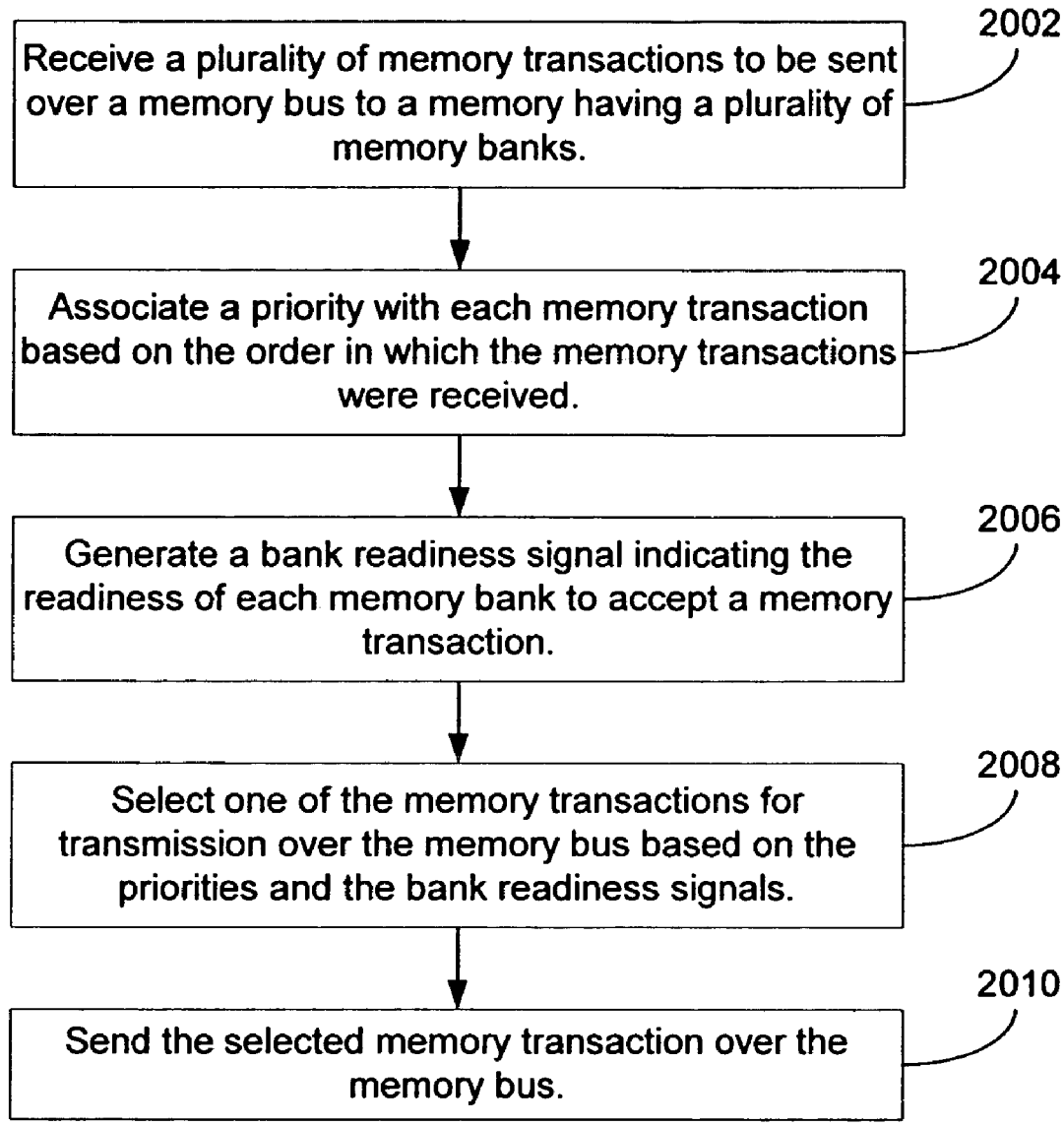
FIG. 20 is a flowchart depicting an example operation of a memory crossbar in sending memory transactions to a memory track based on the availability of memory banks within the memory track according to one implementation.

FIG. 20 is a flowchart depicting an example operation of memory crossbar 912 in sending memory transactions to a memory track 904 based on the availability of memory banks 1808. As described above, each input port 950 within memory crossbar 912 receives a plurality of memory transactions to be sent over a memory bus 934 to a memory track 904 having a plurality of memory banks 1808 (step 2002). Each memory transaction is addressed to one of the memory banks. However, each memory bus 934 is capable of transmitting only one memory transaction at a time.

Each input port 950 associates a priority with each memory transaction based on the order in which the memory transactions were received at that input port 950 (step 2004). In one implementation priorities are associated with memory transactions through the use of forward queue 1504 described above. As memory transactions age, they progress from the top of the queue (request station 1512A) towards the bottom of the queue (request station 1512F). The identity of the request station 1512 in which a memory transaction resides indicates the priority of the memory transaction. Thus the collection of the request stations 1512 within an input port 950 constitutes a set of priorities where each memory transaction has a different priority in the set of priorities.

Arbiter 1606 generates a signal BNKRDY for each request station 1512 based on the availability to accept a memory transaction of the memory bank 1608 to which the memory transaction within that request station 1512 is addressed (step 2006). This information is passed to arbiter 1606 as part of the AGE signal, as described above. Each BNKRDY signal tells the request station 1512 whether the memory bank 1808 to which its memory transaction is addressed is available.

Arbiter 1606 includes a state machine or the like that tracks the availability of memory banks 1808 by monitoring the addresses of the memory transactions gated to memory controller 932. When a memory transaction is sent to a memory bank 1808, arbiter 1606 clears the BNKRDY signal for that memory bank 1808, thereby indicating that that memory bank 1808 is not available to accept a memory transaction.

After a predetermined period of time has elapsed, arbiter 1606 sets the BNKRDY signal for that memory bank 1808, thereby indicating that that memory bank 1808 is available to accept a memory transaction.

As described above, the BNKRDY signal operates to filter the memory transactions within request stations 1512 so that only those memory transactions addressed to available memory banks 1808 are considered by arbiter 1506 for presentation on internal bus 948. Also as described above, arbiter 1606 selects one of the memory transactions presented on internal bus 948 using a fairness scheme. Thus memory crossbar 912 selects one of the memory transactions for transmission over memory bus 934 based on the priorities and the bank readiness signals (step 2008). Finally, memory crossbar 912 sends the selected memory transaction over memory bus 934 to memory tracks 904 (step 2010).

Tag Generator

As mentioned above, the pair of tag generators associated with a bus are configured to independently generate the same tags in the same order. For example, tag generators 1202 and 1302 are associated with bus 922, and tag generators 1402 and 1502 are associated with bus 928.

In one implementation, the tag generators are buffers. The buffers are initialized by loading each buffer with a set of tags such that both buffers contain the same tags in the same order and no tag in the set is the same as any other tag in the set. In One implementation each buffer is a first-in, first-out (FIFO) buffer. In that implementation, tags are removed by "popping" them from the FIFO, and are returned by "pushing" them on to the FIFO.

In another implementation, each of the tag generators is a counter. The counters are initialized by setting both counters to the same value. Each tag is an output of the counter. In one implementation, the counter is incremented each time a tag is generated. If results return across a bus in the same order in which the corresponding memory transactions were sent across the bus, then the maximum count of the counter can be set to account for the maximum number of places (such as registers and the like) that a result sent across a bus and the corresponding memory transaction returning across the bus can reside.

However, if results do not return across a bus in the same order in which the corresponding memory transactions were sent across the bus, a control scheme is used. For example, each count can be checked to see whether it is still in use before generating a tag from that count. If the count is still in use, the counter is frozen (that is, not incremented) until that count is no longer in use. As another example, a count that is still in use can be skipped (that is, the counter is incremented but a tag is not generated from the count). Other such implementations are contemplated.

In another implementation, the counters are incremented continuously regardless of whether a tag is generated. In this way, each count represents a time stamp for the tag. The maximum count of each counter is set according to the maximum possible round trip time for a result and the corresponding memory transaction. In any of the counter implementations, the counters can be decremented rather than incremented.

Figure 21:
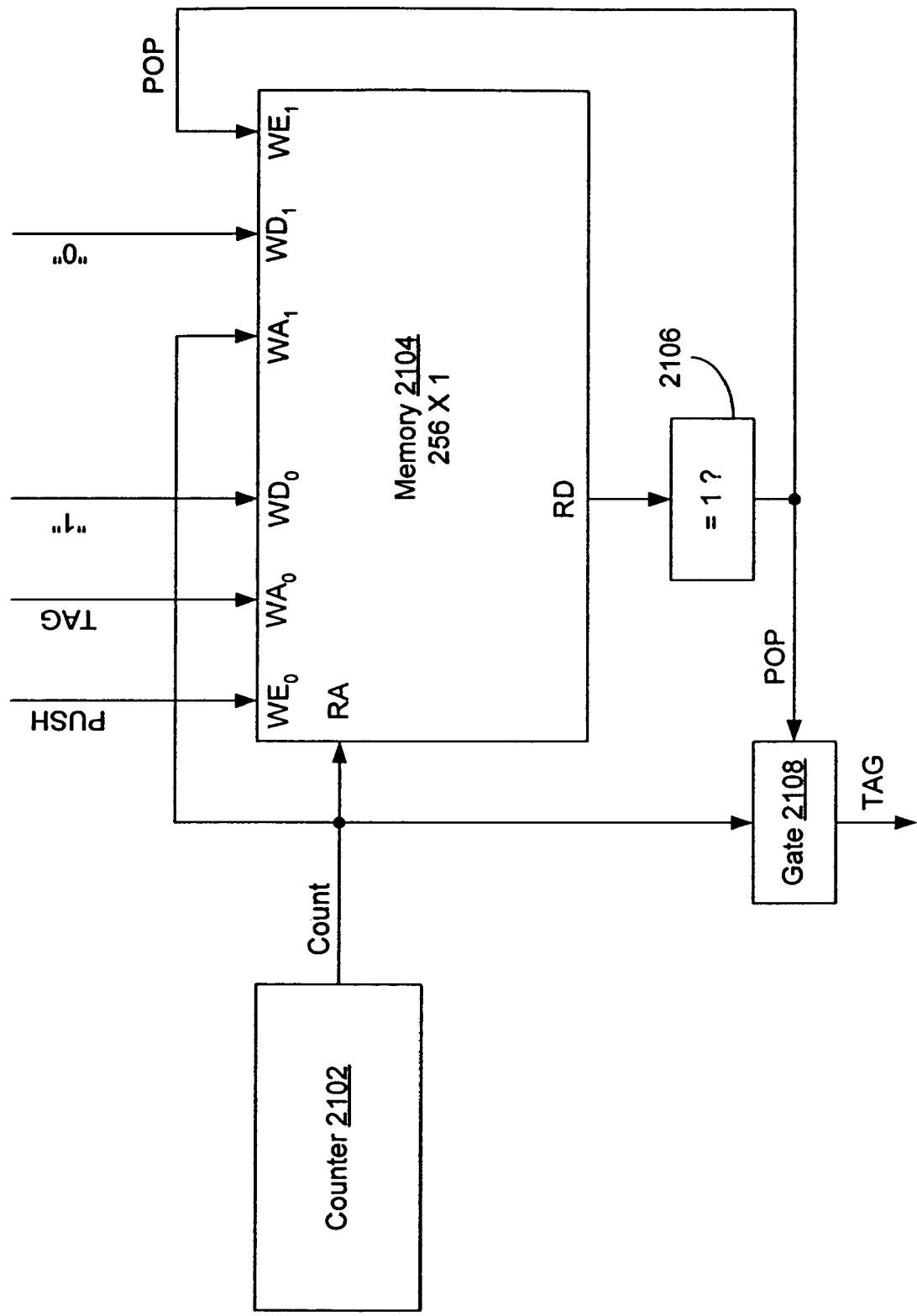
FIG. 21 depicts a tag generator according to one implementation.

In another implementation, depicted in FIG. 21, each of the tag generators includes a counter 2102 and a memory 2104. Memory 2104 is a two-port memory that is one bit wide. The depth of the memory is set according to design requirements, as would be apparent to one skilled in the relevant arts. The contents of memory 2104 are initialized to all ones before operation.

The read address (RA) of memory 2104 receives the count output of counter 2102. In this way, counter 2102 "sweeps" memory 2104. The data residing at each address is tested by a comparator 2106. A value of "1" indicates that the count is available for use as a tag. A value of "1" causes comparator 2106 to assert a POP signal. The POP signal causes gate 2108 to gate the count out of the tag generator for use as a tag. The POP signal is also presented at the write enable pin for port one (WE1) of memory 2104. The write data pin of port one (WD1) is hardwired to logic zero ("0"). The write address pins of port one receive the count. Thus when a free tag is encountered that tag is generated and marked "in-use."

When a tag is returned to the tag generator, its value is presented at the write address pins for port zero (WA0), and a PUSH signal is asserted at the write enable pin of port zero (WE0). The write data pin of port zero (WD0) is hardwired to logic one ("1"). Thus when a tag is returned to the tag generator, that tag is marked "free."

Figure 22:
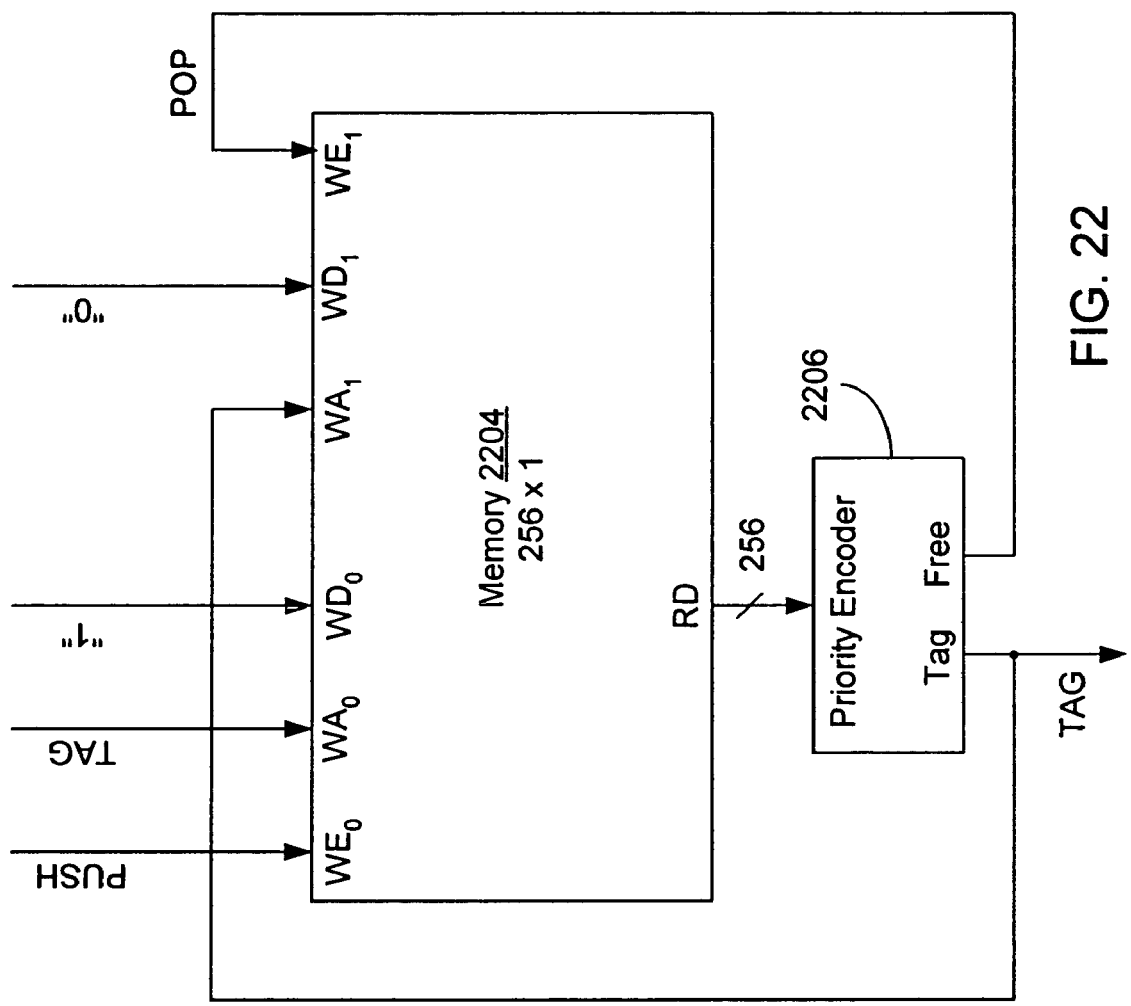
FIG. 22 depicts a tag generator according to another implementation.

In another implementation, shown in FIG. 22, comparator 2106 is replaced by a priority encoder 2206 that implements a binary truth table where each row represents the entire contents of memory 2204. Memory 2204 writes single bits at two write ports $WD_0$ and $WD_1$, and reads 256 bits at a read port RD. Memory 2204 is initialized to all zeros. No counter is used.

One of the rows is all logic zeros, indicating that no tags are free. Each of the other rows contains a single logic one, each row having the logic one in a different bit position. Any bits more significant than the logic one are logic zeros, and any bits less significant than the logic one are "don't cares" ("X"). Such a truth table for a 1×4 memory is shown in Table 1.

TABLE 1

| RD   | Free? | Tag  |
| ---- | ----- | ---- |
| 0000 | No    | none |
| 1XXX | Yes   | 00   |
| 01XX | Yes   | 01   |
| 001X | Yes   | 10   |
| 0001 | Yes   | 11   |

The read data from read port RD is applied to priority encoder 2206. If a tag is free, the output of priority encoder 2206 is used as the tag.

In the above-described implementations of the tag generator, a further initialization step is employed. A series of null operations (noops) is sent across each of busses 922 and 928. These noops do not cause the tag generators to generate tags. This ensures that when the first memory transaction is sent across a bus, the pair of tag generators associate with that bus generates the same tag for that memory transaction.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor, and method steps of the invention can be performed by a programmable processor executing a program of instructions to perform functions of the invention by operating on input data and generating output. The invention can be implemented advantageously in one or more computer programs that are executable on a programmable system including at least one programmable processor connected to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus comprising:
   a first processor switch comprising a plurality of processors and a processor crossbar, each processor coupled to the processor crossbar; and
   a plurality of memory switches, each comprising a plurality of memory controllers and a memory crossbar, each memory controller in a memory switch coupling to the memory crossbar of the memory switch, and each memory crossbar in each of the memory switches coupling to the processor crossbar,
   wherein a first integrated circuit comprises the processor switch and a second integrated circuit comprises at least one of the memory switches.

2. The apparatus of claim 1 further comprising:
   a second processor switch comprising a plurality of processors and a processor crossbar, each processor coupling to the processor crossbar,
   wherein each memory crossbar in each of the memory switches is coupled to the processor crossbars of the first and second processor switches.

3. The apparatus of claim 1 further comprising:
   a plurality of memory tracks each having a plurality of shared memory banks; and
   a plurality memory buses, each coupling a memory controller to a memory track,
   wherein a memory switch is fabricated on a different integrated circuit than a memory track.

4. The apparatus of claim 3 wherein the memory tracks further comprise at least one SDRAM, wherein the SDRAM includes at least one memory bank.

5. A method comprising:
   implementing a first processor switch comprising a plurality of processors and a processor crossbar, each processor coupled to the processor crossbar;
   implementing a plurality of memory switches, each comprising a plurality of memory controllers and a memory crossbar, each memory controller in a memory switch coupling to the memory crossbar of the memory switch, and each memory crossbar in each of the memory switches coupling to the processor crossbar; and
   connecting the processor crossbar with each memory crossbar of each memory switch.

6. An apparatus comprising:
   a plurality of processor switches, wherein each processor switch comprises:
      a plurality of processors; and
      a processor crossbar,
      wherein each processor in a processor switch is coupled to the processor crossbar of the processor switch;
   a first plurality of memory switches, each comprising a plurality of memory controllers and a memory crossbar, each memory controller in a memory switch coupling to the memory crossbar of the memory switch; and
   a first-level intermediate switch comprising a switch crossbar, wherein the switch crossbar is coupled to the processor crossbars and the memory crossbars,
   wherein a first integrated circuit comprises the processor switches and a second integrated circuit comprises the memory switches.

7. The apparatus of claim 6 wherein a third integrated circuit comprises the first-level intermediate switch.

8. The apparatus of claim 7 wherein the processor switch is separate from the first-level intermediate switch.

9. The apparatus of claim 6 wherein the first integrated circuit comprises the first-level intermediate switch.

10. The apparatus of claim 9 wherein the memory switch is separate from the first-level intermediate switch.

11. The apparatus of claim 6 wherein the second integrated circuit comprises the first-level intermediate switch.

12. The apparatus of claim 6 further comprising:
    a second plurality of memory switches, each comprising a plurality of memory controllers and a memory crossbar, each memory controller in a memory switch coupling to the memory crossbar of the memory switch; and
    a plurality of second-level intermediate switches, each comprising a switch crossbar,
    wherein the first plurality of memory switches are coupled to the first-level intermediate switch through a first second-level intermediate switch, and
    the second plurality of memory switches are coupled to a second second-level intermediate switch, and
    the second second-level intermediate switch is coupled to the first-level intermediate switch.

13. The apparatus of claim 6 wherein a processor group further comprises:
    a plurality of clients;
    a plurality of caches;
    a plurality of reorder units; and
    a client funnel, wherein the client funnel is coupled to the caches and the reorder units,
    wherein the clients manage memory requests from processes executing within a processor.

14. The apparatus of claim 6 wherein the processor crossbar further comprises:
  an input port comprising:
   a client interface;
   a queue which further comprises a queue controller and at least one request station;
   an arbiter; and
   a multiplexer,
   wherein the processor crossbar passes memory transactions from a processor to a switch crossbar.

15. The apparatus of claim 14 wherein the input port further comprises:
  a segment interface; and
  a tag generator,
  wherein the input port is located within a switch crossbar.

16. The apparatus of claim 15 wherein the tag generator further comprises:
  a counter; and
  a memory,
  wherein the memory is a two-port memory that is one bit wide.

17. The apparatus of claim 16 further comprising a priority encoder that implements a binary truth table.

18. The apparatus of claim 14 wherein the request station further comprises:
  a forward register;
  a reverse register; and
  a delay buffer.

* * * * *